(12) United States Patent
Rife

(10) Patent No.: US 9,221,083 B2
(45) Date of Patent: Dec. 29, 2015

(54) AIR FILTER RECONDITIONING APPARATUS AND METHOD

(76) Inventor: Robert T. Rife, Kenmore, NY (US)

(*) Notice: Subject to any disclaimer, the term of this patent is extended or adjusted under 35 U.S.C. 154(b) by 799 days.

(21) Appl. No.: 13/481,332

(22) Filed: May 25, 2012

(65) Prior Publication Data

US 2012/0298145 A1 Nov. 29, 2012

Related U.S. Application Data

(60) Provisional application No. 61/490,863, filed on May 27, 2011, provisional application No. 61/580,407, filed on Dec. 27, 2011.

(51) Int. Cl.
| | | |
|---|---|---|
| *B08B 5/02* | (2006.01) | |
| *B01D 41/04* | (2006.01) | |
| *B08B 9/00* | (2006.01) | |

(52) U.S. Cl.
CPC . *B08B 5/02* (2013.01); *B01D 41/04* (2013.01); *B08B 9/00* (2013.01)

(58) Field of Classification Search
CPC ............ B08B 5/02; B08B 9/00; B01D 41/04
See application file for complete search history.

(56) References Cited

U.S. PATENT DOCUMENTS

| | | | |
|---|---|---|---|
| 4,842,624 A | 6/1989 | Barton | |
| 5,078,763 A | 1/1992 | Blount-Gillette | |
| 5,182,832 A | 2/1993 | McMahon | |
| 5,228,993 A | 7/1993 | Drori | |
| 5,322,535 A | 6/1994 | Simms et al. | |
| 5,332,448 A | 7/1994 | Phillips | |
| 5,565,012 A | 10/1996 | Buodd | |
| 5,584,900 A * | 12/1996 | Zaiser et al. | 55/293 |
| 5,735,337 A | 4/1998 | Edwards | |
| 5,915,439 A * | 6/1999 | Zaiser | 15/304 |
| 6,616,512 B2 | 9/2003 | Sotozaki | |
| 7,534,278 B2 | 5/2009 | Consoli et al. | |
| 7,815,701 B2 | 10/2010 | Grieve | |
| 2003/0033688 A1* | 2/2003 | McMahon | 15/405 |
| 2003/0131438 A1* | 7/2003 | Holman et al. | 15/304 |
| 2004/0079231 A1* | 4/2004 | Green et al. | 95/280 |
| 2007/0044660 A1* | 3/2007 | McClelland | 95/279 |
| 2009/0151572 A1* | 6/2009 | Ferguson et al. | 96/427 |
| 2011/0005176 A1* | 1/2011 | Grieve | 55/294 |
| 2012/0073251 A1* | 3/2012 | Troxell et al. | 55/302 |
| 2013/0037061 A1* | 2/2013 | Grieve | 134/22.18 |
| 2013/0056035 A1* | 3/2013 | Kraai | 134/25.1 |

* cited by examiner

*Primary Examiner* — Alexander Markoff
(74) *Attorney, Agent, or Firm* — Del Vecchio and Stadler LLP

(57) ABSTRACT

An air filter reconditioning apparatus is provided for cleaning air filters. There is a vessel body with a lid and an arbor axle tube provides a source of incoming air. A two stage live arbor is provided having a first roller bearing fitted on the arbor axle tube, a spacer ring fitted on the first roller bearing, a second roller bearing fitted on the arbor axle tube, an impeller ring fitted on the second roller bearing and a housing fitted on the spacer ring and the impeller ring, with an air redirection plate disposed in the housing and fitted to the arbor axle tube. A V-grooved arbor nozzle adapter is threadably connected to the housing such that the housing and the V-grooved nozzle adapter rotate around the arbor axle tube. Nozzles defined in the V-grooved arbor nozzle adapter direct air into the air filter during rotation.

19 Claims, 20 Drawing Sheets

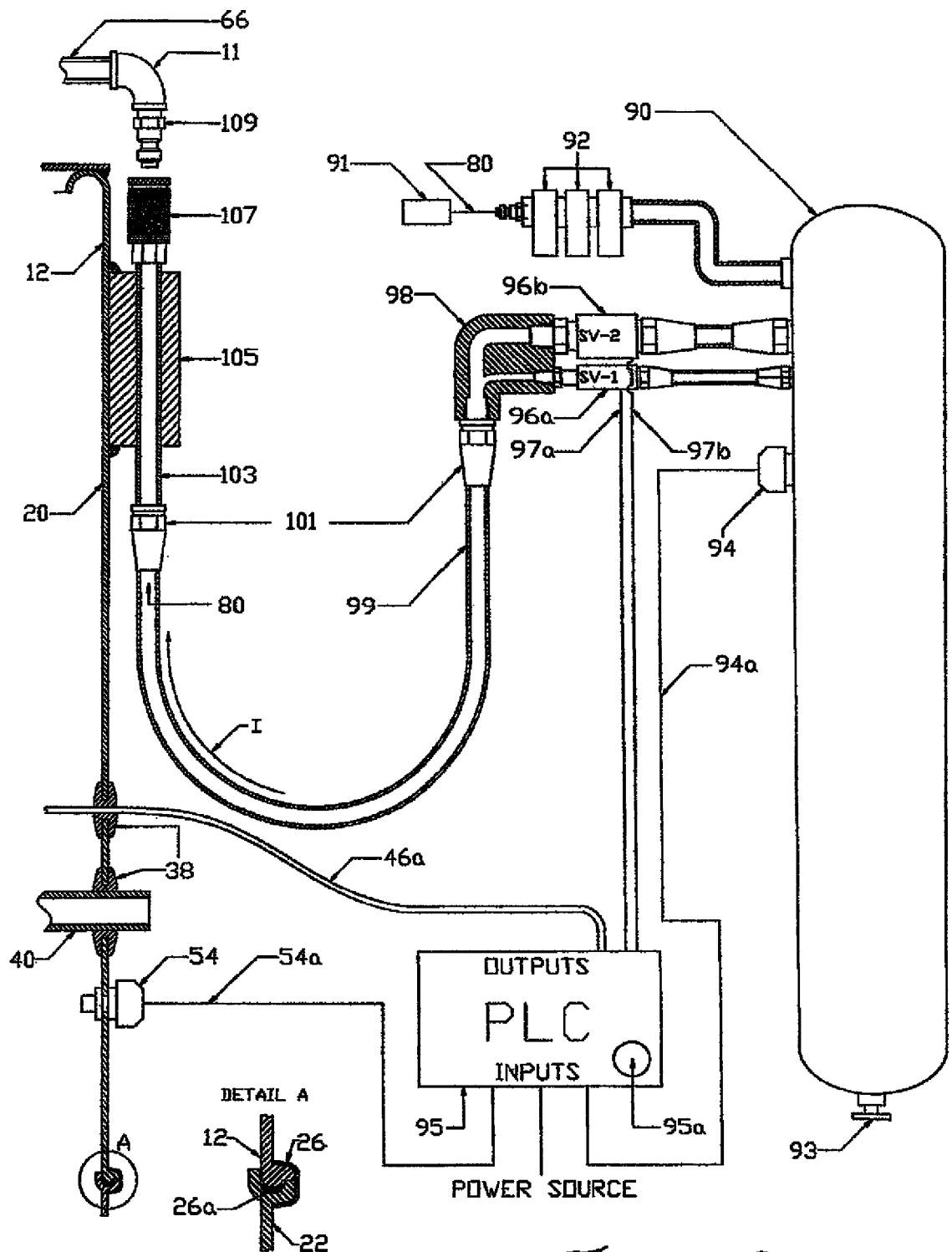

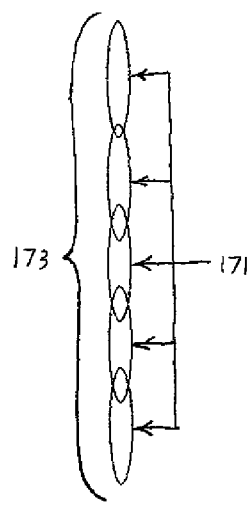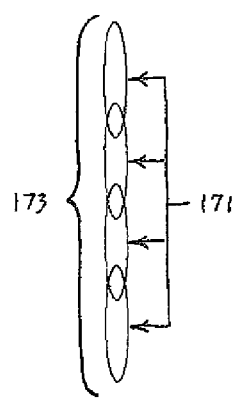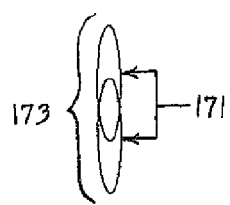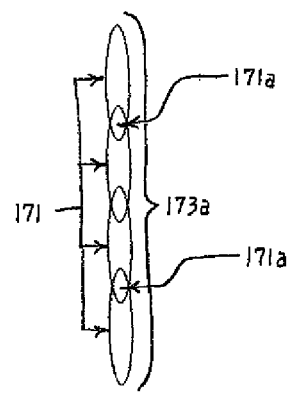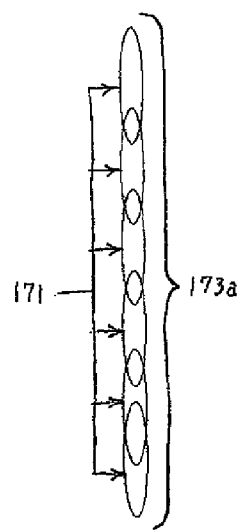
Figure 13a         Figure 13b

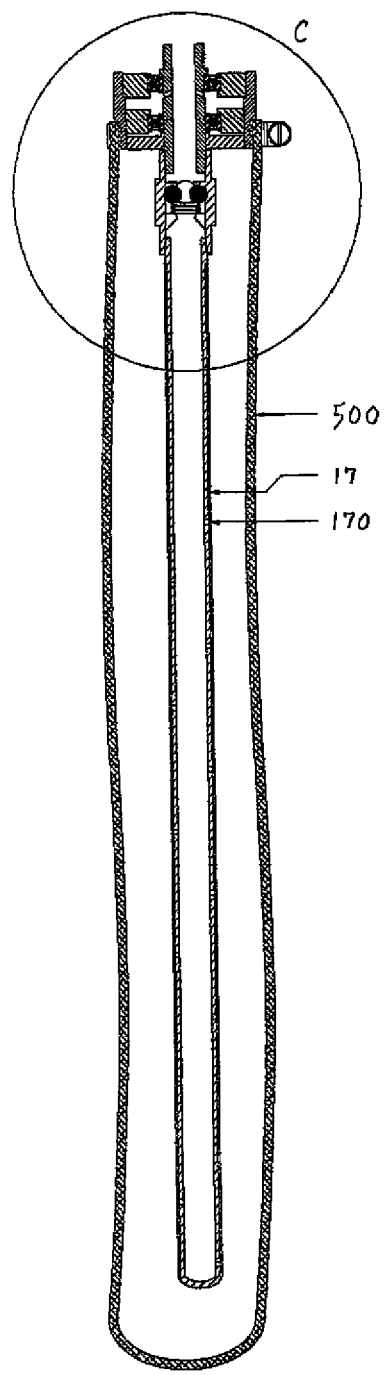
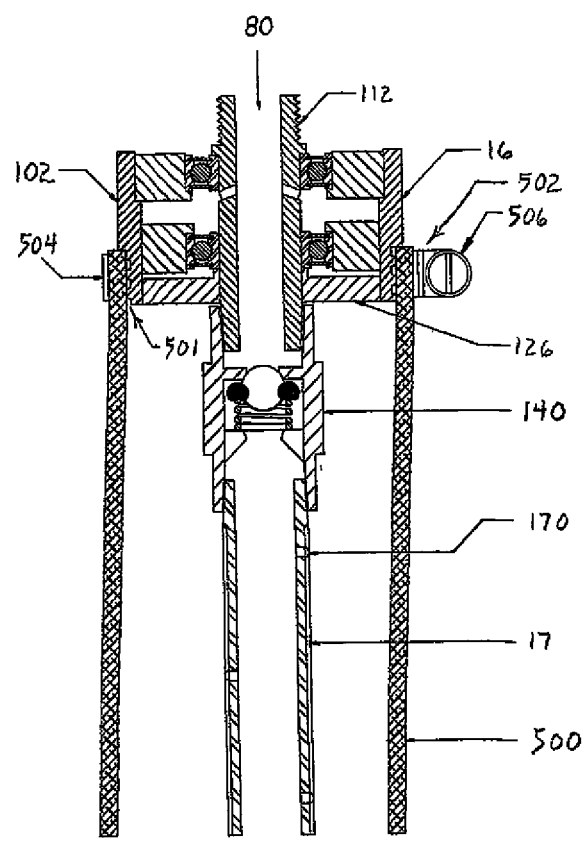
Figure 17
Figure 18

AIR FILTER RECONDITIONING APPARATUS AND METHOD

CROSS REFERENCE TO RELATED APPLICATIONS

This application claims priority to U.S. Provisional Application having Ser. No. 61/490,863, filed on May 27, 2011 the entire disclosure of which is hereby incorporated herein by reference, and this application claims priority to U.S. Provisional Application having Ser. No. 61/580,407, filed on Dec. 27, 2011 the entire disclosure of which is hereby incorporated herein by reference.

FIELD OF INVENTION

This invention is directed to a device for cleaning air filters.

BACKGROUND OF INVENTION

There exists a need for vehicles to have clean air filters at all times. This is due to the fact that in order for an engine to perform properly it requires a constant supply of clean air. During combustion the incoming air must be clean. If the incoming air is dirty, then the internal passages in the engine may become fouled and the internal components of the engine will wear out prematurely. Thus, air filters are a critical component of every engine.

In addition, some engines are used in very dusty environments. For example, engines used in heavy construction equipment are constantly exposed to dust at the worksite. The air filters of these engines become quickly fouled with dust particles, plant vegetation, insects, etc. Indeed, in some instances very dirty air filters have been known to spontaneously combust as the air is drawn through the dirty air filter.

Conventional solutions to the problem of dirty air filters include replacing the air filter or cleaning the air filter. Replacing the air filter is not a cost efficient solution because some air filters cost hundreds of dollars. As for cleaning the air filters, the machines presently used for cleaning air filters are massive, non-transportable, expensive, and have large energy requirements. In addition, the air filters are removed from the vehicles and must be transported to the cleaning facility. The cleaning facility itself requires massive pieces of equipment to produce pressurized air, vacuums, etc. In addition, these cleaning facilities are very expensive to operate.

What is needed is an air filter cleaner that is inexpensive, easy to use, lightweight and energy efficient.

SUMMARY OF THE INVENTION

An air filter reconditioning apparatus and method is provided. The air filter reconditioning apparatus includes an air filter cleaning assembly and an air supply assembly. The air filter cleaning assembly includes a vessel body, a lid, a two-stage live arbor, a V-grooved arbor nozzle adapter, and an arbor axle tube that is supported by the lid, such that the lid supports the two-stage live arbor. The two-stage live arbor includes a pair of internal roller bearings, an impeller ring and an air redirection plate, and the two-stage live arbor is mounted on an arbor axle tube. A relief valve is joined to the end of the arbor axle tube. There is a V-grooved arbor nozzle adapter that is threaded to the two-stage live arbor such that the two-stage live arbor and the V-grooved arbor nozzle adapter are capable of rotating together. The V-grooved arbor nozzle adapter has a cylindrical wall and an arbor end cap, and there is a first V-groove defined in the cylindrical wall and there are nozzle adapter openings defined in the cylindrical wall such that the first V-groove is in fluid communication with nozzle adapter openings. Custom shaped and sized V-grooved arbor nozzle adapters can be threaded to the live arbor such that air filters of many different sizes can be cleaned.

In addition, a pressure relief valve threaded to an end of the arbor axle tube can be removed from the end of the arbor axle tube and a V-groove arbor nozzle adapter can be threaded to the end of the arbor axle tube. This allows smaller dimensioned air filters to be cleaned, for example the air filters used in small portable equipment. In addition, a filter bag to be cleaned can be clamped to the two-stage live arbor and cleaned by the V-grooved arbor nozzle adapter. Various adapters can be utilized to adapt differently configured air filters and positioned between the filter and the lid, for example a PowerCore® brand air filter. PowerCore® brand air filters are commercially available from and manufactured by Donaldson Company, Inc. 1400 West 94th Street, Minneapolis, Minn. 55431.

The nozzle adapter openings are defined in the cylindrical wall of the V-grooved arbor nozzle adapter can be in spaced apart groups of nozzle adapter openings that are linearly aligned with one another. The cylindrical wall also defines a second V-groove and defines additional nozzle adapter openings that are in fluid communication with the second V-groove. The first and second V-grooves are diametrically opposed to one another, that is, they are disposed about 180 degrees apart from one another on the cylindrical wall of the V-grooved arbor nozzle adapter. In addition, the nozzle adapter openings in fluid communication with the first V-groove can be offset relative to the nozzle adapter openings in fluid communication with the second V-groove.

The air supply assembly is for controllably delivering incoming by initially delivering incoming air at a reduced rate to cause the live arbor to being rotating. The incoming air flows through the arbor axle tube and though arbor axle tube ports defined in the arbor axle tube where it is delivered to a live arbor interior. The incoming airflow then flows through the impeller ring and through the air redirection plate, thus causing the two-stage live arbor to commence rotating about the arbor axle tube, and this also causes V-grooved arbor nozzle adapter to begin rotating. Then, the air supply assembly delivers a larger volume of air to the arbor axle tube to open a pressure relief valve disposed at the end of the arbor axle tube to deliver a sufficient amount of air to clean the air filter. The air exits out the nozzle adapter openings of the V-grooved arbor nozzle adapter and impacts an internal surface of an air filter to be cleaned and blows dirt and debris out of the air filter. The air supply assembly includes a programmable logic controller to regulate the pressure and rate and duration of the incoming air being delivered to the arbor axle tube.

In other preferred embodiments the dimensions of the components of the air filter cleaning assembly can be varied to accommodate differently sized air filters.

BRIEF DESCRIPTION OF THE DRAWING FIGURES

FIG. 3 is a sectional view of an air supply assembly for use in the of the air filter reconditioning apparatus.

FIG. 4 is an enlarged view of detail A of FIG. 3 showing a clamp.

FIG. 13a depicts air impact patterns taken along line T-T of FIG. 13.

FIG. 13b depicts air impact patterns taken along line V-V of FIG. 13.

FIG. 17 is a sectional view of another preferred embodiment showing a filter bag to be cleaned clamped to the two stage live arbor and the V-grooved arbor nozzle adapter is threaded to an arbor axle tube.

FIG. 18 is an enlarged view of detail C shown in FIG. 17.

DETAILED DESCRIPTION

Figure 1:
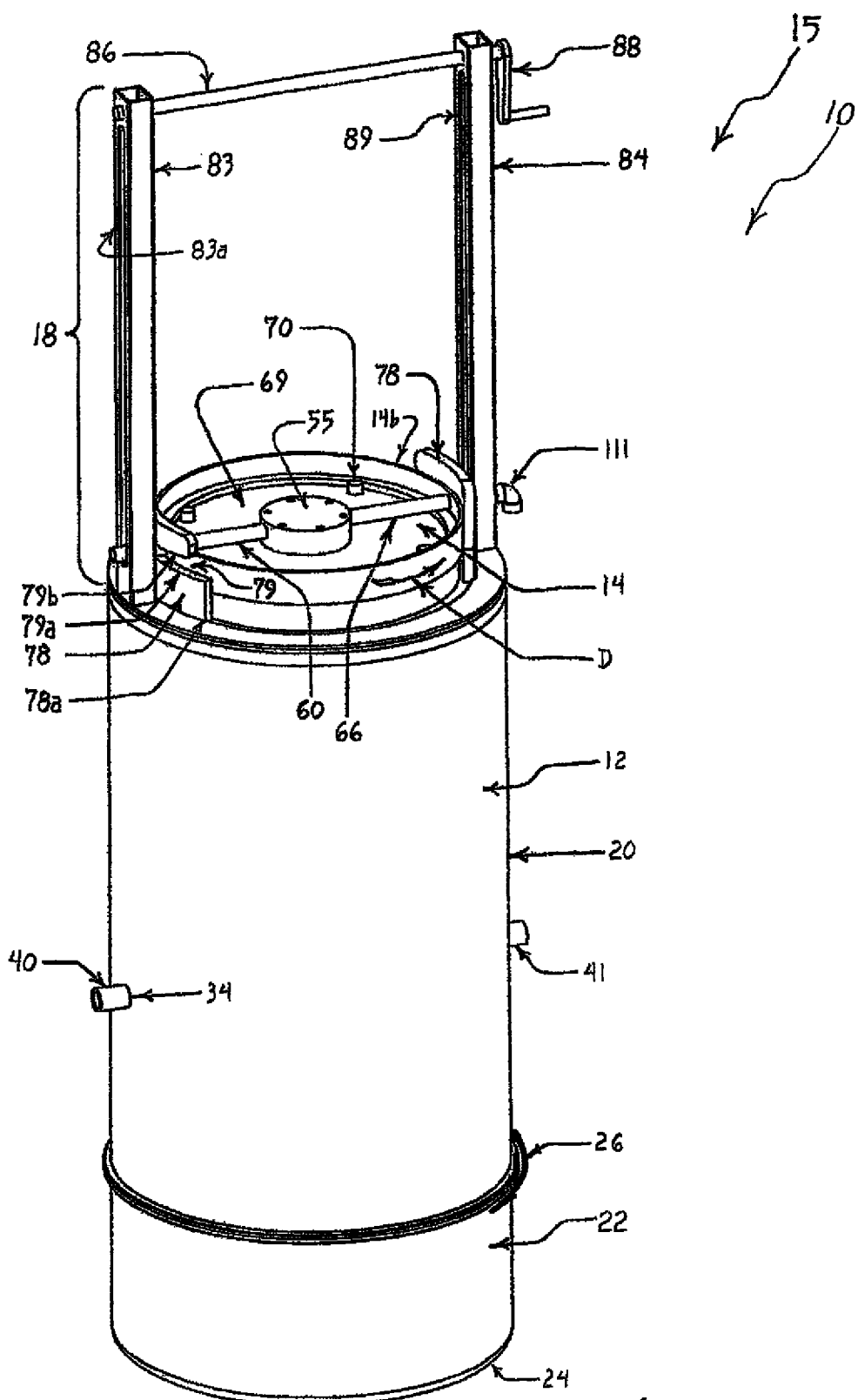
FIG. 1 is a perspective view of the air filter cleaning assembly of an air filter reconditioning apparatus.

In the following description common reference numbers are used to designate the same parts, pieces or components, surfaces or elements that are shown in the drawing figures.

An air filter reconditioning apparatus 10 is shown in FIGS. 1-4 and comprises an air filter cleaning assembly 15 and an air supply assembly 21. In particular, the air filter cleaning assembly 15 is shown in FIGS. 1, 1a, and 5-13b, and the air supply assembly 21 is shown in FIGS. 3 and 4. The air filter cleaning assembly 15 includes a vessel body 12, a lid 14, a two-stage live arbor 16, a V-grooved arbor nozzle adapter 17 and a lifting guide assembly 18. The air filter reconditioning apparatus 10 is for cleaning air filters 11 (FIG. 6) used in cars, heavy construction equipment, small engines, and other types of air filters as will be described presently.

Figure 2:
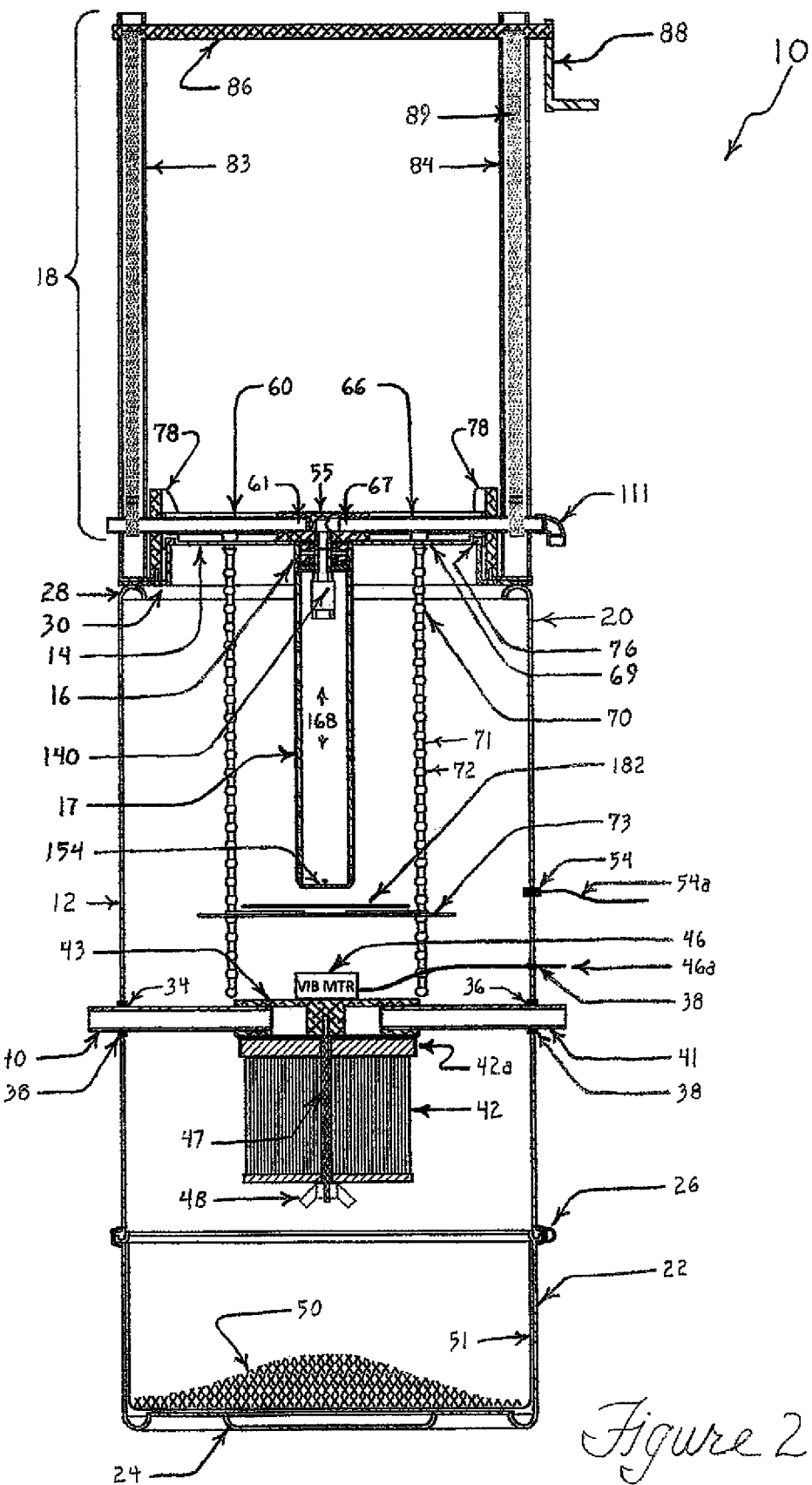
FIG. 2 is a front sectional view of the air filter cleaning assembly of FIG. 1.
Figure 2A:
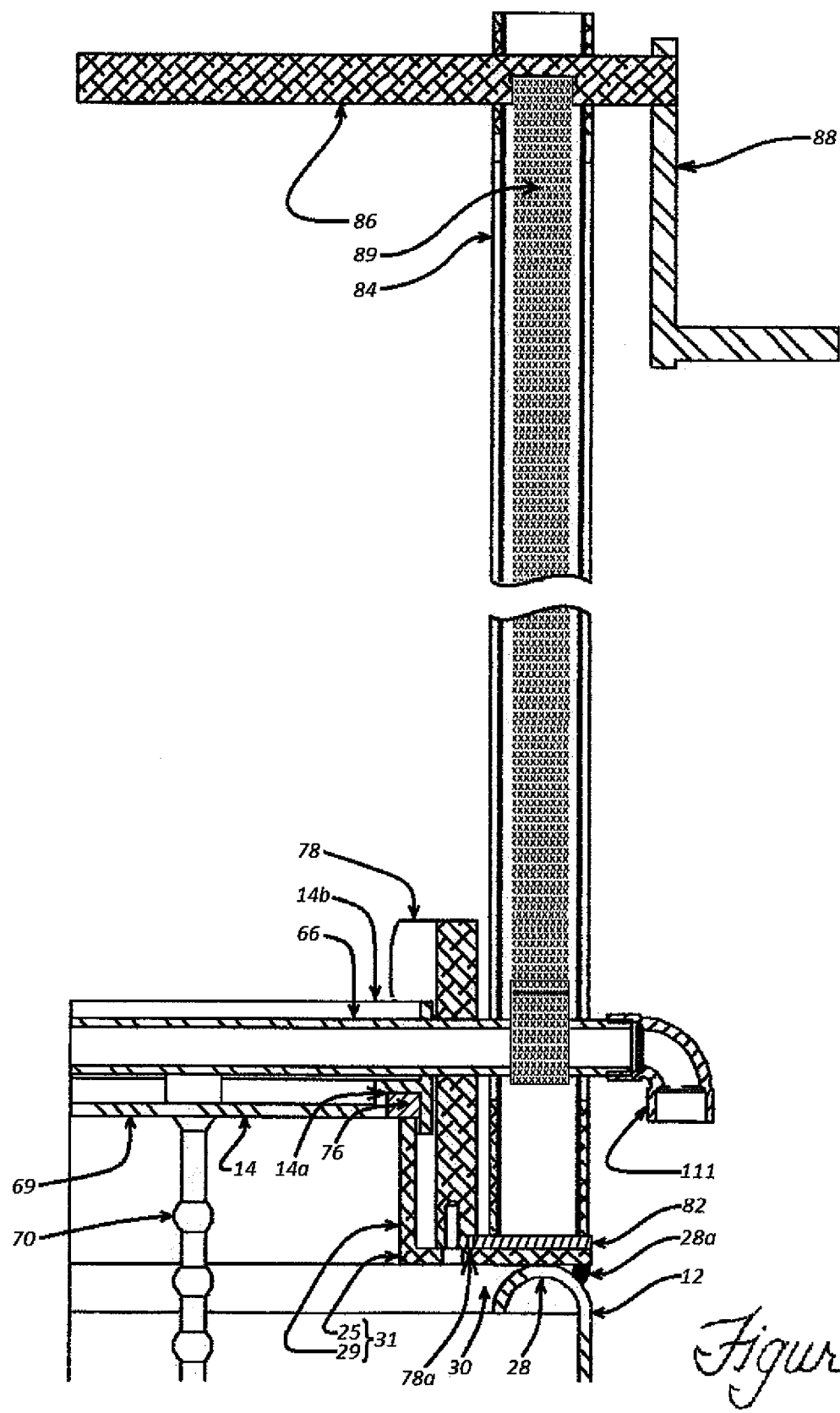
FIG. 2a is a sectional view of a portion of a lifting guide assembly.

As best shown in FIGS. 2 and 2a the vessel body 12 has a surrounding wall portion 20 joined to a base portion 22 having a base wall 24. The surrounding wall portion 20 and the base portion 22 are joined with at a clamp 26 and a clamping seal 26a as shown in (FIGS. 4-5), such that an airtight seal is formed when the base portion 22 and surrounding wall portion 20 are clamped together. The surrounding wall portion 20 has vessel body end wall 28 that defines a vessel body opening 30. The vessel body end wall 28 is joined to riser component 31 with, for example a weld 28a. The riser component 31 has a first riser portion 25 that is joined to a second riser portion 29, such that the second riser component 29 is perpendicular relative to the first riser component 25. The second riser component 29 abuts against an O-ring 76 that is disposed the lid 14, and in particular a lid recess 14a defined in the lid 14. The lid also has a surrounding flange 14b (FIGS. 2a and 6) that provides the lid 14 with rigidity and support for a lid-cross bar 60 and an incoming air cross tube 66. The O-ring 76 prevents the seepage of air out of the vessel body 12, thus ensuring the vessel body 12 and lid 14 form an airtight seal when the lid 14 is clamped to the vessel body 12. Joined to the first riser portion 25 with, for example a bolt or a weld, is a latch 78, and as will be described presently latches 78 are employed to releasably secure the lid 14 to the vessel body 12. Also shown is a rotating ring 82 that is partially disposed in a latch recess 78a such that the rotating ring 82 is rotatably secured and supported on the first riser portion 25, thus allowing the lid 14 to be rotated relative to the latches 78. The vessel body 12 can comprise metal, aluminum, plastics, fiberglass and other suitable materials.

As shown in FIG. 2, the vessel body 12 defines first and second exhaust tube openings 34, 36. Grommets 38 are positioned in each of the first and second exhaust tube openings 34, 36. A first exhaust tube 40 extends through the first exhaust tube opening 34 and grommet 38 and into a filter support housing 43. A second exhaust tube 41 extends through the second exhaust tube opening 36 and grommet 38 into the filter support housing 43. The grommets 38 ensure an airtight seal. The filter support housing 43 supports an outflow air filter 42 and a high efficiency particulate air (HEPA) filter 42a for filtering the air prior to the air exiting the vessel body 12 through the first and second exhaust tubes 40, 41. The outflow air filter 42 and HEPA filter 42a are disposed such that they abut the air filter support housing 43 and are secured thereto with a stud 47 and a wing nut 48. The air exiting the first and second exhaust tubes 40, 41 is thus filtered before it exits the vessel body 12. It is pointed out that air can only exit the air filter reconditioning apparatus 10 through outflow air filter 42 and HEPA filter 42a and the first and second exhaust tubes 40, 41 because of the airtight seals formed by the grommets 38, the a clamping seal 26a, and the O-ring 76. In addition, in one of the preferred embodiments all the air filters mentioned herein are embodied as (HEPA) type air filters. A vibrator 46 is mounted on the filter support housing 43 so that the air filter 42 can be vibrated when the vibrator 46 is activated, such that the outflow filter 42 is capable of self-cleaning when vibrated manually or as an automatic function of the PLC 95 cycle. A debris bag 51 is disposed in the base portion 22 and is for collecting debris 50. The debris bag 51 may be removed and disposed of or shaken out and reused. The vessel body 12 also has mounted thereon a safety switch 54, and a lead 54a extends from the safety switch 54 and connects to a programmable logic controller 95 (hereinafter sometimes referred to as PLC) that is part of the air supply assembly 21. The PLC 95 can automatically turn off the air filter reconditioning apparatus 10 in the event the pressure level internal to the vessel body 12 exceeds a predetermined amount or is other problems are detected.

The lid 14 shown has a hub 55 (shown in detail in FIGS. 11, 11a-11c) and the hub 55 is attached to the lid 14 with bolts or screws 56. The hub 55 has a hub side wall 57 that defines a first hub opening 58 that has a first internal hub thread 59. A lid-cross bar 60 having an external thread 61 (FIG. 2) is threaded to the first internal hub thread 59. The hub 55 also defines second hub opening 62 with a second internal hub thread 63, and defines an arbor axle tube opening 64 with an internal arbor axle tube thread 65. The internal arbor axle tube thread 65 is capable of being threaded to an arbor axle tube 112 (shown in FIGS. 9 and 10). An incoming air cross tube 66 having an external thread 67 is threaded to the second hub internal thread 63 (FIG. 2). In addition to allowing for the flow of incoming air 80, the air cross tube 66 in combination with the lid-bar 60 are used for raising and lowing the lid 14. The arbor axle tube 112 is threaded to the internal arbor axle tube thread 65. An incoming air 80 flow passage 68 is thus defined by the incoming air cross tube 66, the second hub opening 62, the arbor axle tube opening 64 and the arbor axle tube 112. In FIGS. 2 and 3 the source of the incoming air flow 80 is an accumulator 90 that is pressurized by a compressor 91. A filter regulator dryer 92 is in fluid communication with and disposed between the air compressor 91 and the accumulator 90. The incoming air flow 80 is designated by the letter I in FIG. 3. The compressor 91 can be designed to run efficiently at about 90-100 cubic feet of air per minute. The lid 14 can be embodied with a lid pressure port 81 with a gauge 85 in order to monitor the internal pressure of the air filter 11.

As shown in FIG. 2a the lid 14 also has web 69 that supports beaded cords 70 in a sealed manner such that air cannot escape through the web 69, and the beaded cords 70 have segments 71 that are joined to beads 72. There is a filter support grid plate 73 (best shown in FIGS. 6 and 7) that has rings 74 that are spaced apart and have different diameters and U-shaped members 75 that are joined to the rings 74. Together, the rings 74 and U-shaped members 75 define grid openings 77. The ends 75a of each of the U-shaped members 75 are spaced from one another by segment gap distance designated SD in FIG. 7 that is sized to allow the segments 71 to pass there-through, but not the beads 72. The ends 75a are spaced from one another and extend beyond the ring 74. The segments 71 are capable of being moved in and out of the U-shaped members 75 to adjust the position of the filter support grid plate 73 relative to the web 69. The filter support grid plate 73 is thus supported on the beads 72 and may be moved closer or farther from the web plate 69 and thus the lid 14 by adjusting the beaded cords 70. Air filters 11 (see FIG. 6) of different dimensions can be supported on the filter grid support plate 73. In addition, the filter support grid plate 73 allows debris 50 to pass through the through the grid openings 77 defined by the filter support plate grid 73 and fall into the base portion 22.

In another preferred embodiment the filter support grid plate 73 is used in combination with a sealing disc 182 that can be used in connection with air filters 11 that are open at both ends.

Figure 1A:
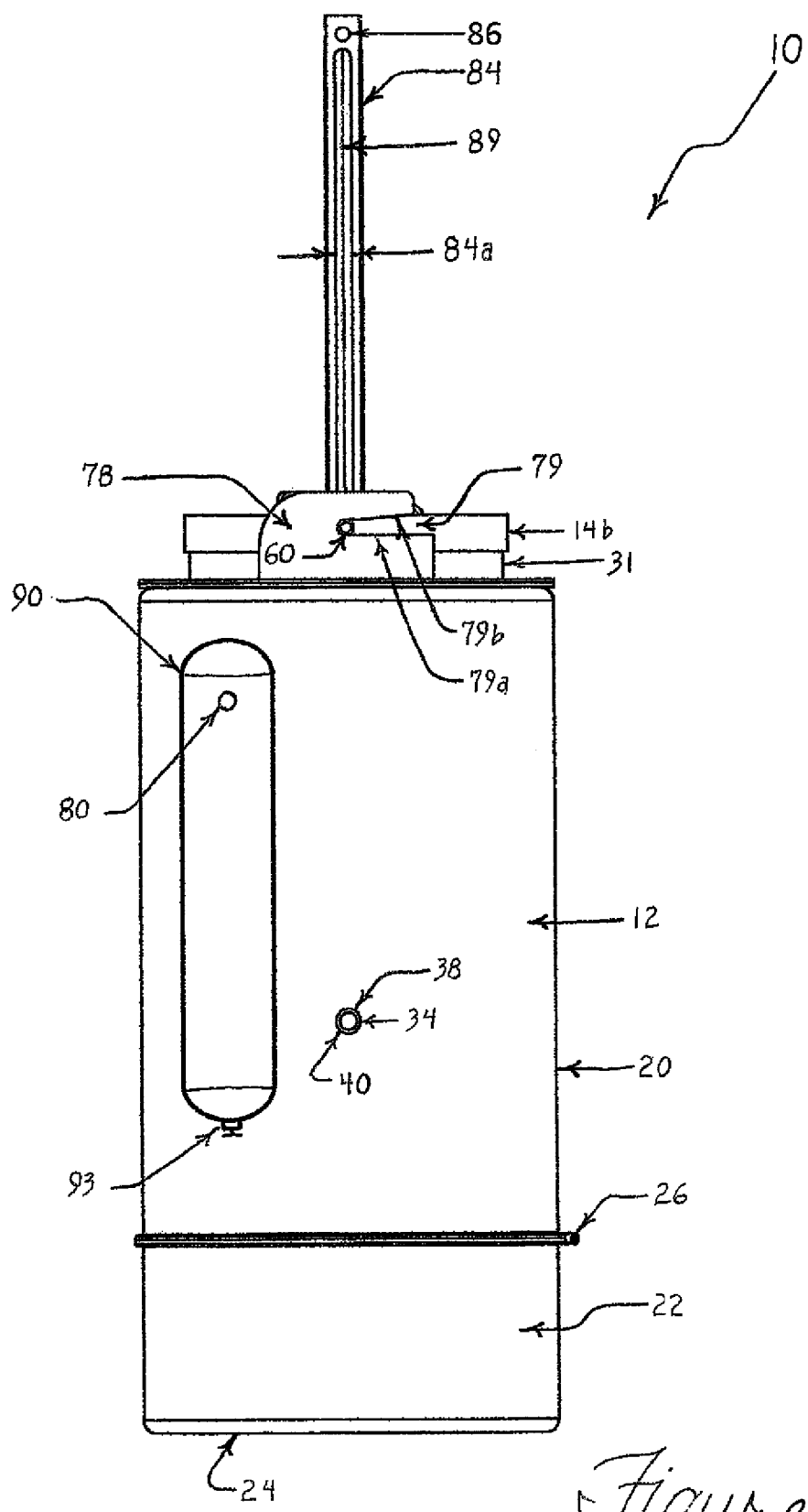
FIG. 1a is an elevational view of the air filter cleaning assembly of the air filter reconditioning apparatus.

As shown in FIGS. 1, 1a, 2a extending from and joined to the vessel body end wall 28 is a pair of latches commonly designated 78. Each of the latches 78 has facing first and second latch edges 79a, 79b that defines a latch opening 79, and the latch openings 79 are sized to receive the lid-cross bar 60 and the incoming air cross tube 66. The latches 78 are for releasably securing the lid 14 to the vessel body 12.

The lifting guide assembly 18 includes the previously mentioned rotating ring 82 that is supported on the first riser portion 25 of the riser component 31. First and second lifting guides 83, 84 extend from and are joined with the rotating ring 82, such that the applying a rotational force (a force in the direction of arrow D shown in FIG. 1) to the first and second lifting guides 83, 84 results in the rotation of the first and second lifting guides 83, 84 relative to the latches 78. This rotation allows the lid-cross bar 60 and the incoming air cross tube 66 move in and out of the latches 78 between a locked lid position (shown in FIG. 1) wherein the lid-cross bar 60 and the incoming air cross tube 66 are received in the latches 78, and an unlocked lid position wherein the lid-cross bar 60 and the incoming air cross tube 66 are not positioned in the latches 78. Extending from and rotatably supported by the first and second lifting guides 83, 84 is a lifting bar 86. Each of the first and second lifting guides 83, 84 define elongated slots 83a, 84a, sized to receive the lid-cross bar 60 and the incoming air cross tube 66. The first and second lifting guides 83, 84 have function to guide (and prevent damage to) the lid 14, the two-stage live arbor 16, and the arbor nozzle adapter 17 as they are lifted out of the vessel body 12 or fitted on the vessel body 12. As shown in FIGS. 2 and 2a, a hand crank 88 is provided and is connected to the lifting bar 86. The straps 89 are joined to the lifting bar 86 at one end thereof and looped around lid-cross bar 60 and incoming air cross tube 66 at the other ends thereof. Rotating the hand crank 88 (when the lid-cross bar 60 and the incoming air cross tube 66 are not positioned in the latches 78) coils the strap 89 around the lifting bar 86 and in doing so the strap 89 exerts a lifting force on the lid 14 to thus raise the lid 14. This lifting of the lid 14 by way of the hand crank 88 is only possible when the lid-cross bar 60 and the incoming air cross tube 66 have been rotated out of the latches 78.

Figure 5:
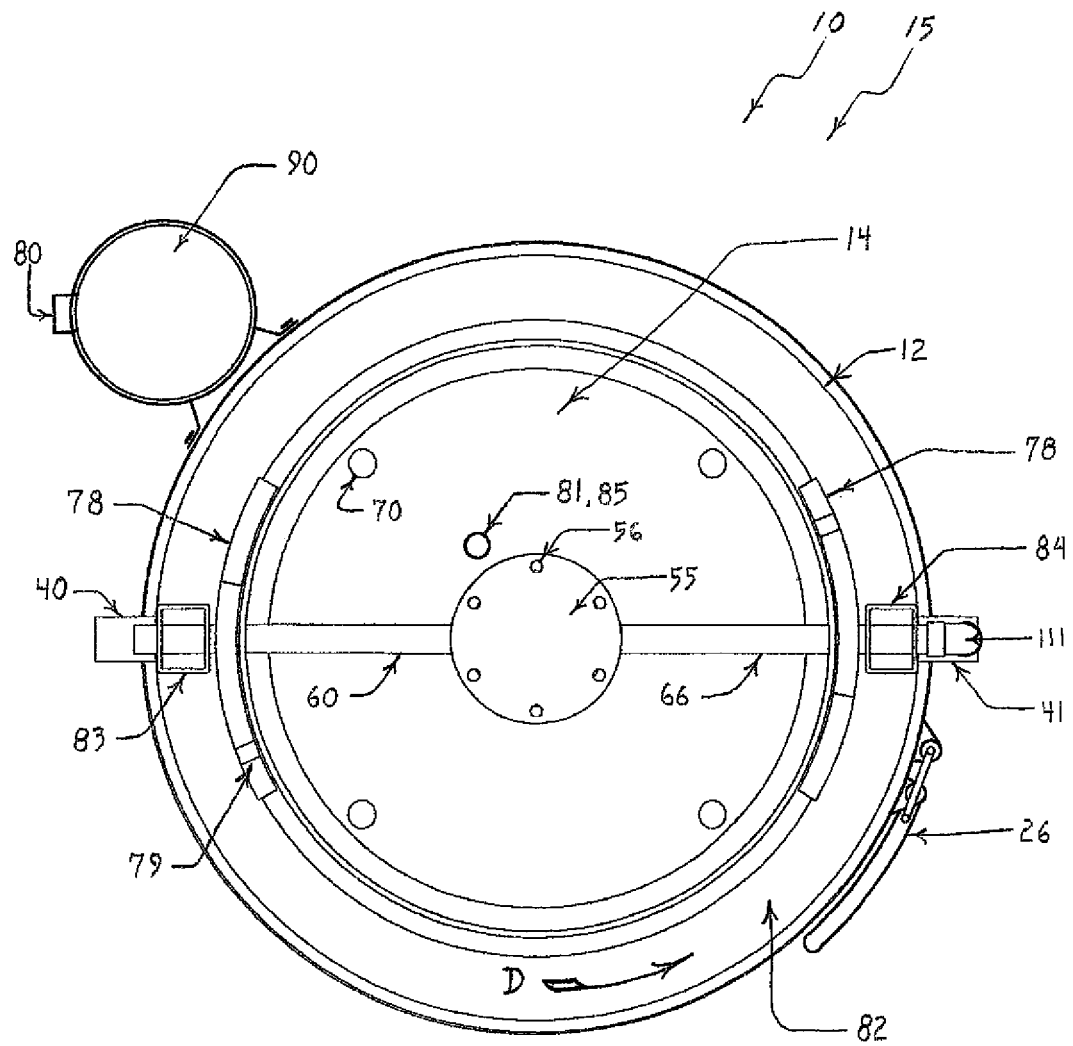
FIG. 5 is a top plan view of the air filter cleaning assembly of the air filter reconditioning apparatus wherein a lifting bar for lifting a lid is not shown.
Figure 6:
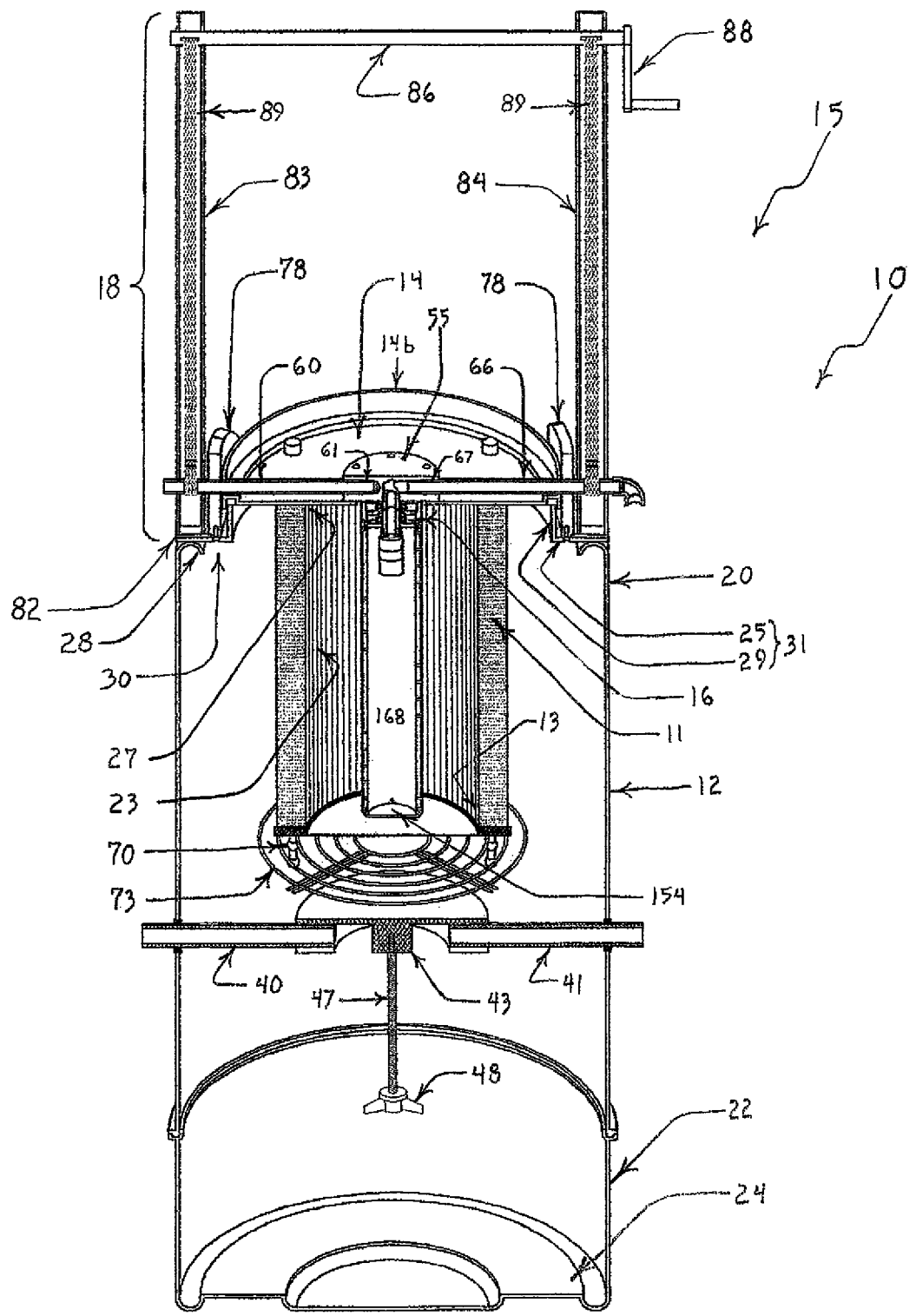
FIG. 6 is a sectional perspective view of the air filter cleaning assembly showing an air filter disposed in the air filter reconditioning apparatus.
Figure 7:
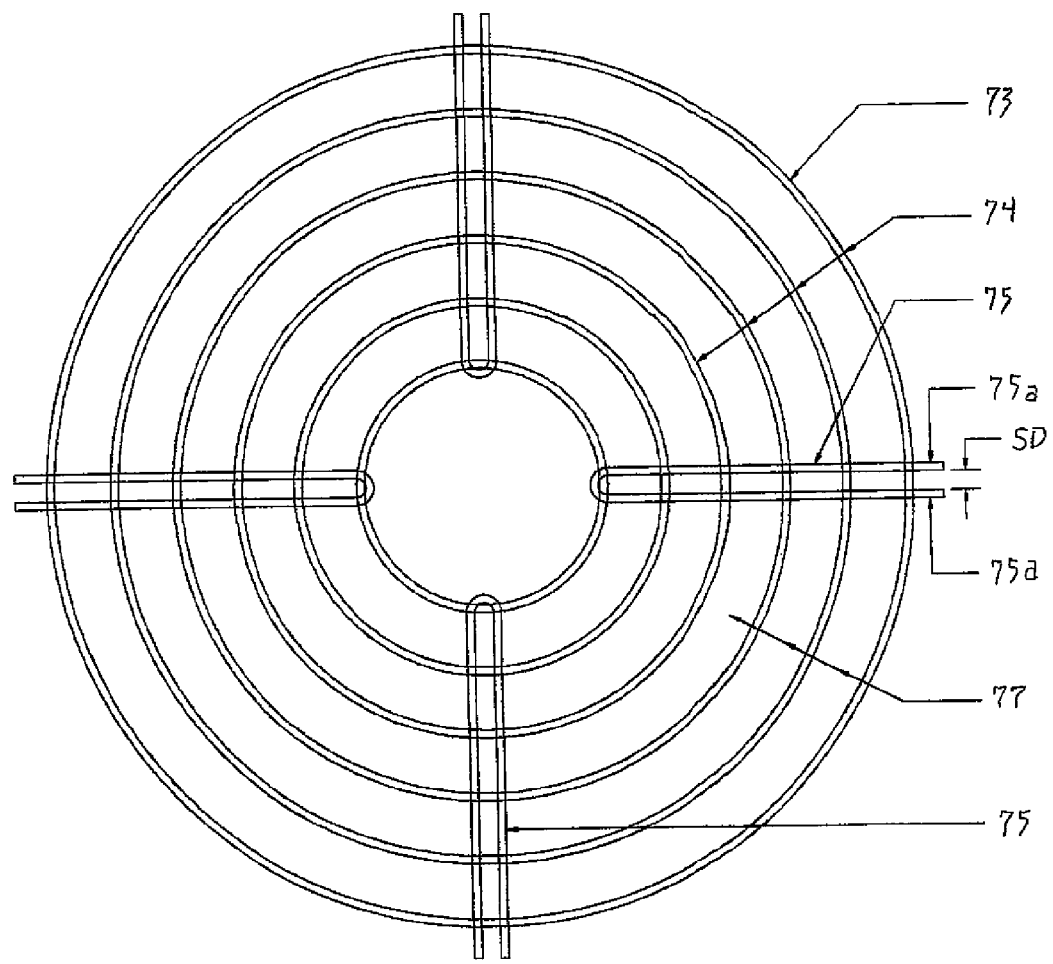
FIG. 7 is a top plan view of the as a filter support grid plate for supporting the air filter.

FIGS. 3 and 4 show the air supply assembly 21 that includes the accumulator 90 and compressor 91 for supplying the incoming air 80. In particular, the accumulator 90 is the source of the incoming air 80 that is provided to the two-stage live arbor 16. In one of the preferred embodiments the accumulator 90 is mounted on the vessel body 12 (FIGS. 1a and 5). The compressor 91 compresses air that flows through the filter regulator dryer 92 and then the air flows into the accumulator 90. The accumulator 90 has a drain cock 93 and a pressure transducer 94, and the pressure transducer 94 detects the pressure of the air internal to the accumulator 90. A pressure transducer lead 94a is provided that is connected to the pressure transducer 94 and the programmable logic controller 95. Internal accumulator 90 pressure data is sent to the PLC 95 by way of the pressure transducer lead 94a. The PLC 95 controls the flow of air in the air supply assembly 21 by controlling the opening and closing of the first and second solenoid valves 96a, 96b. Such programmable logic controllers can, for example, be commercially obtained from Siemens AG having corporate headquarters in Munich, Germany.

There are first and second solenoid valves 96a, 96b are in fluid communication with the interior of the accumulator 90, and the first and second solenoid valves 96a, 96b are under the control of the PLC 95 via first and second leads 97a, 97b. The first solenoid valve 96a is for allowing a very low flow rate of air to escape out of the accumulator 90 to initiate spinning of the two-stage live arbor 16. Then, the second solenoid valve 96b allows for a greater flow rate of air to escape from the accumulator 90 to increase the volume of incoming air 80 and unseating the pressure relief valve 140 to deliver a greater volume of incoming air 80 to thoroughly clean the air filter 11. In particular, the incoming air 80 air flows through the first and second solenoid valves 96a, 96b and into a manifold 98, and then through a compression fitting 101 and through an air hose 99 and through a second compression fitting 101 that is joined to a pipe 103 that is supported by and extends through a guide 105. The guide 105 is attached to the vessel body 12. The pipe 103 is connected to a coupler body 107 that, in turn, is connected to an air nipple 109. An elbow 111 connects the air nipple 109 to the incoming air cross tube 66 (shown in FIGS. 1 and 2). It is pointed out that the elbow 111 and air nipple 109 prevent coupling of to coupler body 107 if they are not properly aligned and in a functional position.

The vibrator 46 is connected to a wiring harness 46a that connects the vibrator 46 to the PLC 95, and the wiring harness 46 extends through a grommet 38 and into the vessel body 12, such that the grommet 38 forms an airtight seal. The PLC 95 controls and monitors the operation and functioning of the vibrator 45. The PLC 95 also regulates the rate of incoming air 80 by controlling the by controlling the first and second solenoid valves 96a, 96b, such that the blasts of incoming air 80 can be monitored and controlled. The frequency, duration of pulses of incoming air 80 and complete cycle times are adjustable and preset via the PLC 95 (or may be controlled by the user/operator depending on the air filter 11 and the size of the compressor 91). In addition, the PLC 95 includes a manual pulse button 95a that the operator can manually depress to manually activate the second solenoid valve 96b. Programmable logic controllers and the operation and use and operation of programmable logic controllers are well known to those having ordinary skill in the art and are therefore not described in greater detail herein.

As shown in FIGS. 2, 6 and 8-10 there is a two stage a two stage live arbor 16 that has a housing 102 with opposed first and second housing ends 104, 106 spaced from one another by a housing wall 108 that has a cylindrical shape. The housing 102 defines a housing port 125 in the housing wall 108. The housing wall 108 has an externally threaded portion 110 that extends from the first housing end 104 and in a direction toward the second housing end 106 for a distance designated DD. The arbor axle tube 112 has opposed first and second threaded arbor axle tube ends 115a, 115b and the first threaded arbor axle tube end 115a is threaded to the hub 55. A common central axis designated X passes through the housing 102 and the arbor axle tube 112 as shown in FIG. 2. As will be described presently, the housing 102 is cable of rotating about the arbor axle tube 112.

Figure 8:
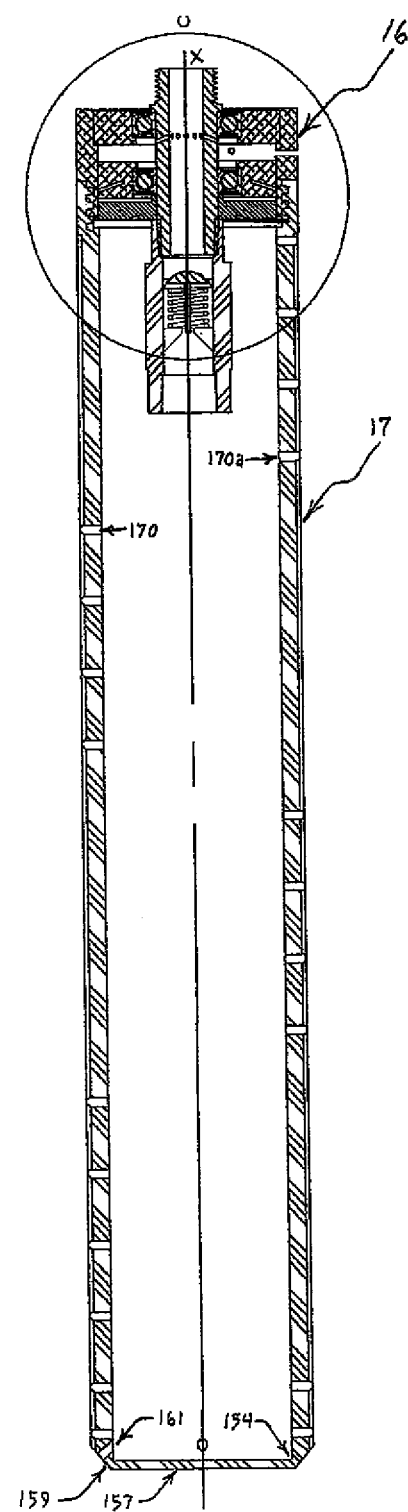
FIG. 8 is a sectional view of a two stage live arbor and a V-grooved arbor nozzle adapter.
Figure 9:
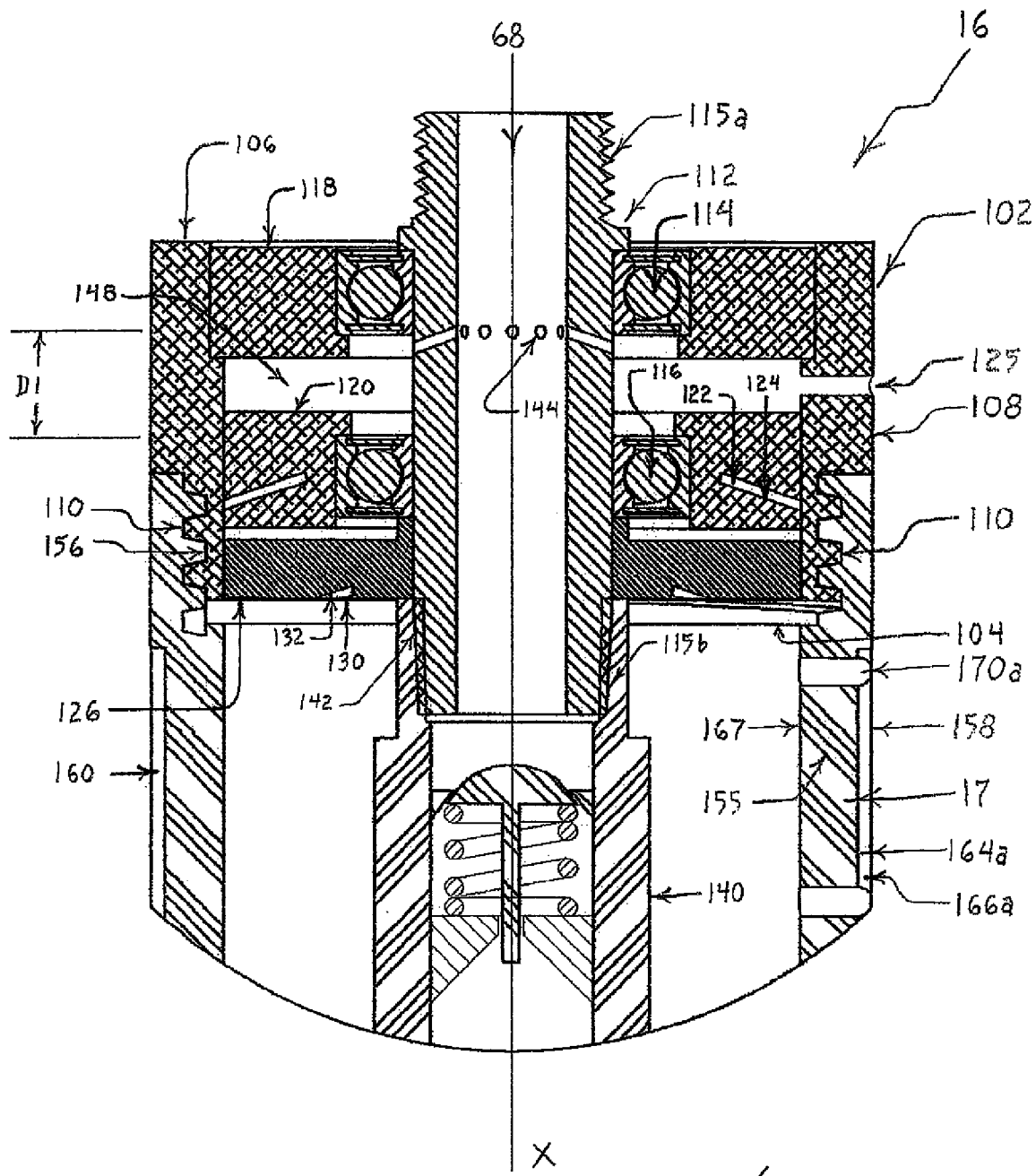
FIG. 9 is an enlarged view of detail B of FIG. 8 of the two stage live arbor and a portion of the V-grooved arbor nozzle adapter.
Figure 10:
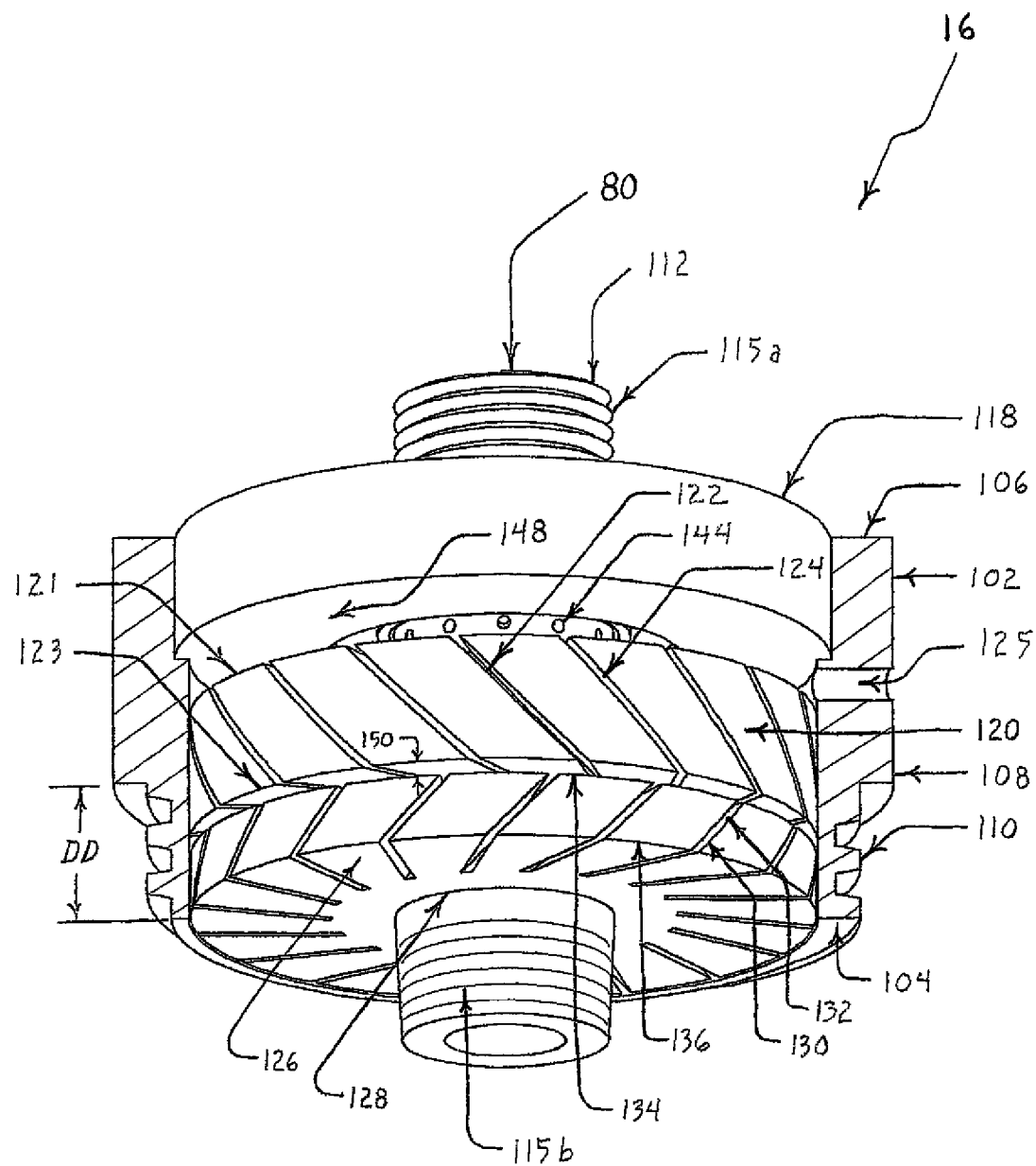
FIG. 10 is an enlarged view of the two-stage live arbor and arbor axle tube wherein a portion of the housing is removed.
Figure 11B:
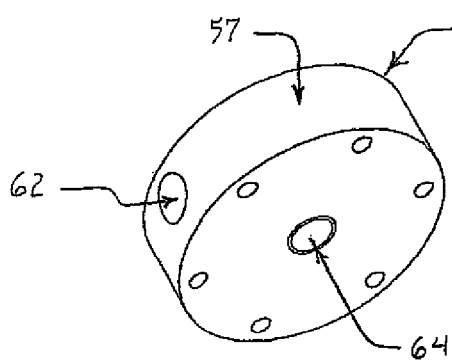
FIG. 11b is a front perspective view of the hub.
Figure 11C:
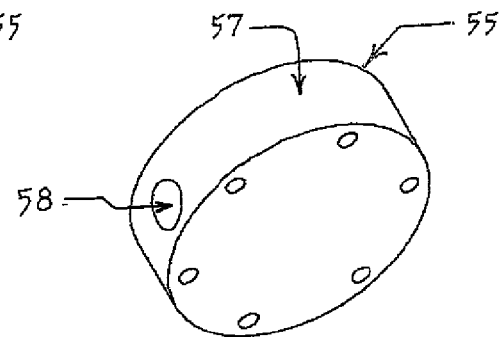
FIG. 11c is rear perspective view of the hub shown in FIG. 11B.
Figure 11A:
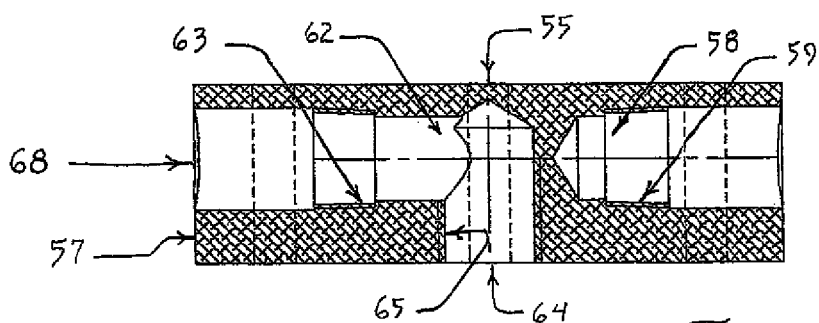
FIG. 11a is a sectional view of the hub taken along line X-X of FIG. 11.
Figure 11:
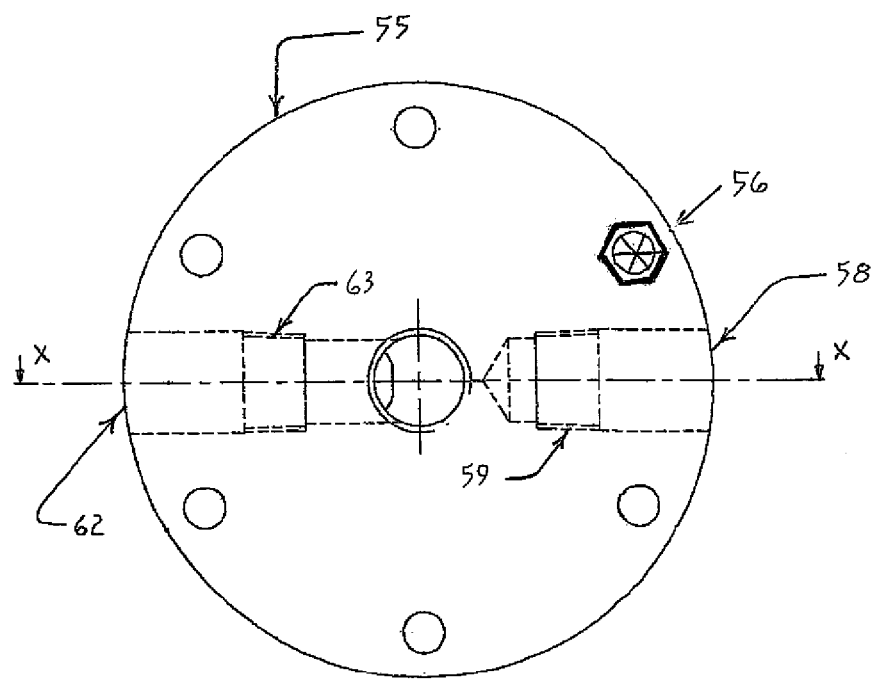
FIG. 11 is a top plan view of a hub that is connected to a lid.

As shown in FIGS. 8 and 9 first and second roller bearings 114, 116 are press fit on the arbor axle tube 112 and spaced a distance designated D1 from one another. A spacer ring 118 is press fit on the first roller bearing 114. An impeller ring 120 is press fit on the second roller bearing 116. The housing 102 is press fit on the spacer ring 118 and the impeller ring 120 has opposed first and second impeller ring sides 121, 123 (best shown in FIG. 10). The impeller ring 120 has vanes 122 for directing the flow of air. Slots 124 are defined in the impeller ring 120 to define the vanes 122, and the vanes 122 are for directing the flow of incoming air flow 80. The vanes 122 and the slots 124 are sloped or disposed at about a forty-five degree angle relative to the opposed first and second impeller ring sides 121, 123 in one of the preferred embodiments. The slots 124 have a negative slope as viewed in FIG. 10.

The two-stage live arbor 16 further includes an air redirection plate 126 that defines a redirection plate opening 128 sized to receive the arbor axle tube 112. The air redirection plate 126 is moved over the arbor axle tube 112 and press fit to the arbor axle tube 112 such that it is fixed to the arbor axle tube 112. Thus, the impeller ring 120 is disposed between the first roller bearing 114 and the air redirection plate 126. The air redirection plate 126 has air redirection plate vanes 130 and defines air redirection plate slots 132 between the air redirection plate vanes 130. The air redirection plate 126 has opposed first and second air redirection plate sides 134, 136. The air redirection plate slots 132 and the air redirection plate vanes 130 are disposed about a forty-five degree angle relative to the opposed first and second air redirection plate sides 134, 136, and have a positive slope as viewed in FIG. 10 in one of the preferred embodiments. Thus, the vanes 122 of the impeller ring 120 and the air redirection plate vanes 130 are sloped in opposite directions relative to one another. It is pointed out that the air redirection plate 126 is about 0.002 to about 0.005 inches from the housing 102 in one of the preferred embodiments.

The second threaded arbor axle tube end 115b is threaded to an internal pressure relief valve thread 142 of a pressure relief valve 140. As will be described presently, the pressure relief valve 140 opens after the two stage live arbor 16 has started to spin by the air reacting through the impeller ring 120 and the air redirection plate 126.

The arbor axle tube 112 is hollow and defines arbor axle tube ports 144 about the circumference of the arbor axle tube 112. In particular, the arbor axle tube ports 144 are defined in a portion 146 of the arbor axle tube 112 disposed between the first roller bearing 114 and the second roller bearing 116. There can be a plurality of arbor axle tube ports 144 and each can have a diameter of about 0.125 inches in one of the preferred embodiments. The arbor axle tube ports 144 are sloped in a direction toward the impeller ring 120 and can have a slope of about forty-five degrees in one of the preferred embodiments.

The housing 102, the arbor axle tube 112, the first roller bearing 114, the second roller bearing 116, the spacer ring 118 and the impeller ring 120 define an arbor interior 148. Incoming air is thus capable of flowing through the arbor axle tube 112 and through the arbor axle tube ports 144 where it is delivered to the arbor interior 148. The incoming air flow 80 flows through the slots 124 of the impeller ring 120 and exits the impeller ring 124 at about a forty-five degree angle in one of the preferred embodiments. The incoming air flow 80 changes direction when is passes through the redirection plate slots 132 of the air redirection plate 126. The incoming air flow 80 initiates the rotation of the two-stage live arbor 16 as the incoming air flow 80 applies a force against the vanes 122 of the impeller ring 120. The incoming air 80 is redirected as it flows through the air redirection plated vanes 130 directing the incoming air 80 in a direction to further generate rotation of two stage live arbor 16 and the V-grooved arbor nozzle adapter 17. It is pointed out that the initial incoming air flow 80 is isolated in the arbor interior 148 causes the rotation of both the two-stage live arbor 16 and the V-grooved nozzle adapter 17 to which it is threaded. It is pointed that the arbor interior 148 remains isolated such that the flow of incoming air 80 is restricted to flowing through the vanes 122 of the impeller ring 120 air redirection plate vanes 130 to initiate rotation of the two stage live arbor 16 until the pressure relief valve 140 opens in response to an increased flow of incoming air 80 supplied when the second solenoid valve 96b opens.

In one of the preferred embodiments the air redirection plate 126 is spaced about 0.025 to about 0.075 inches from the impeller ring 120, and this distance defines an air gap 150 between the two. The air redirection plate 126 is spaced about 0.002 to about 0.005 inches from the housing 102 in one of the preferred embodiments.

As shown in FIGS. 2, 6, 8, 9, 12-13 the V-grooved arbor nozzle adapter 17 has opposed first and second arbor nozzle adapter ends 152, 154, a cylindrical wall 155 that extends from the first arbor, nozzle adapter end 152 to the second arbor nozzle adapter ends 154, and, an arbor end cap 157 that is joined to the second arbor nozzle adapter end 154. The arbor end cap 157 has a beveled edge 159. The first arbor nozzle adapter end 152 has an internal adapter thread 156 (see FIGS. 8 and 9) that can be threaded to the externally threaded portion 110 (FIG. 10) of the housing 102. When the two-stage live arbor 16 is threaded to the V-grooved arbor nozzle adapter 17 and they are joined, and the first and second roller bearings 114, 116 allow the arbor nozzle adapter 17 to freely rotate relative to the stationary arbor axle tube 112. The V-grooved arbor nozzle adaptor 17 has a length designated L in FIG. 12 and the length L may be, for example six inches to twenty inches in length, and may be embodied to have other lengths and virtually any desired diameter. It is pointed out that a common central axis designated X in FIG. 8 passes through the V-grooved arbor nozzle adapter 17 and two stage live arbor 16.

Figures 12, 12A:
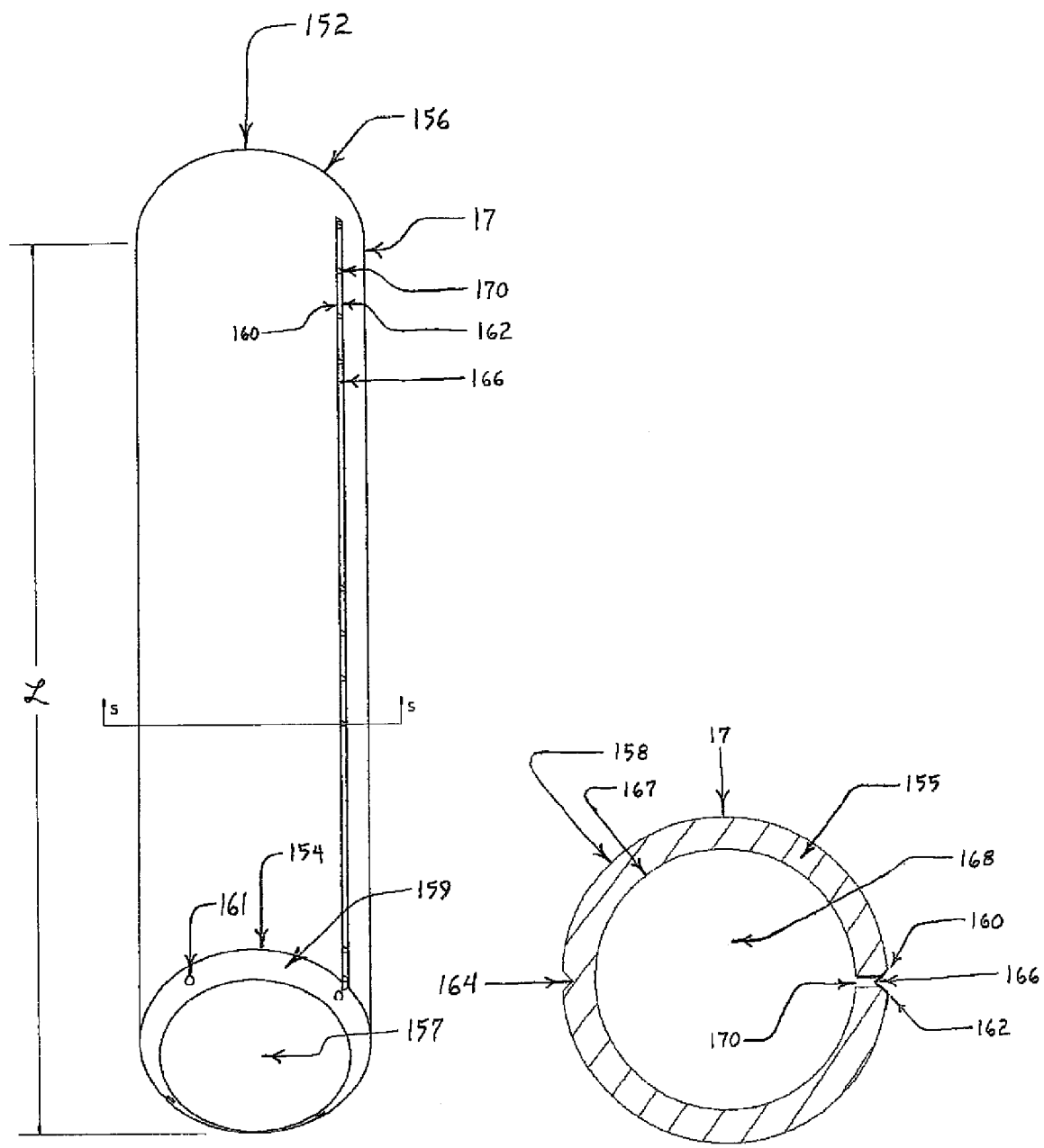
FIG. 12 is a perspective view of the V-grooved arbor nozzle adapter.
FIG. 12a is a sectional view of the V-grooved arbor nozzle adapter taken along line S-S of FIG. 12.
Figure 13:
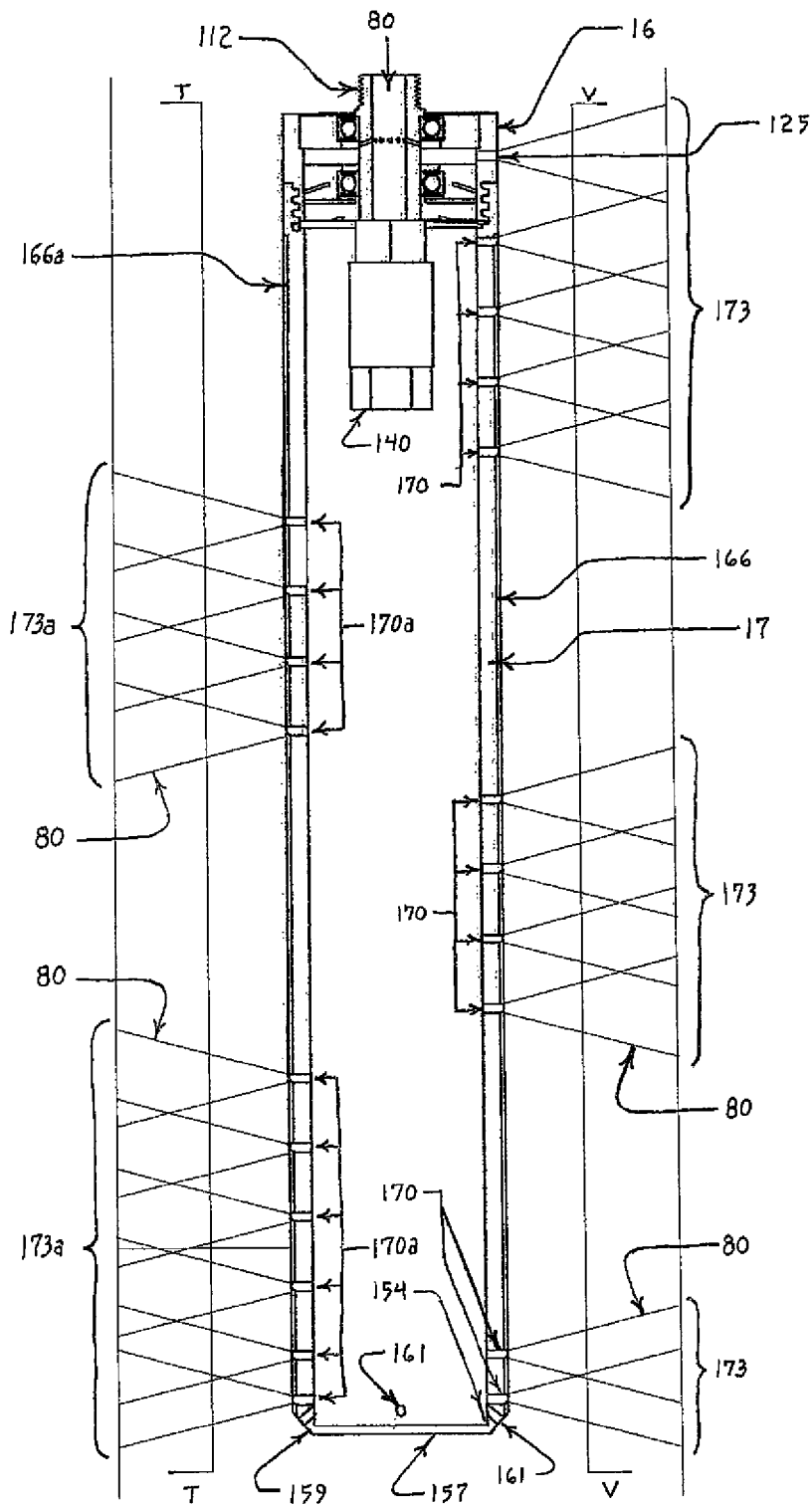
FIG. 13 is a sectional view of the V-grooved arbor nozzle adapter of FIG. 12 depicting air flowing out of the V-grooved arbor nozzle adapter.

As shown in FIGS. 12 and 13 the cylindrical wall 155 of the V-grooved arbor nozzle adapter 17 has an external adapter surface 158. Formed in the external adapter surface 158 are first and second nozzle adapter walls 160, 162 that are disposed such that they face one another and slope in opposite directions. The first and second nozzle adapter walls 160, 162 meet at a V-groove edge 164 that extends longitudinally along the V-grooved arbor nozzle adapter 17. Each of the opposed first and second nozzle adapter walls 160, 162 extends from about at or at the first arbor nozzle adapter end 152 to the second nozzle adapter end 154. Together, the first and second nozzle adapter walls 160, 162 define a first V-shaped groove 166 in the V-grooved arbor nozzle adapter 17.

The V-grooved arbor nozzle adapter 17 is hollow and has a V-grooved nozzle adapter interior surface 167. Together the adapter interior surface 167 and the arbor end cap 157 define an adapter interior 168. The V-grooved nozzle adapter 17 defines nozzle adapter openings 170 that extend and extend through the cylindrical wall 155. The nozzle adapter openings 170 are defined such that they open at the V-groove edge 164 formed by the first and second nozzle adapter walls 160, 162. Thus, incoming air flow 80 is directed as it flows from the adapter interior 168, through the adapter nozzle openings 170 and into the first V-shaped groove 166. As shown in FIG. 13, the V-grooved arbor nozzle adapter 17 defines an identically shaped second V-shaped groove 166a that is diametrically opposed the previously described V-shaped groove 166, such that first and second V-shaped grooves 166, 166a are spaced and defined 180 degrees apart from one another on the V-grooved nozzle adapter 17. The second V-shaped groove 166a is defined by first and second nozzle adapter walls 160a, 162a that meet at a V-groove edge 164a, and nozzle adapter openings 170a are defined in the second V-shaped groove 166 that open into the second V-shaped groove 166a.

The air incoming air 80 exiting each of the adapter nozzle openings 170, 170a has a an elliptical shaped pattern 171 (see FIGS. 13, 13a and 13b) that impacts the air filter interior surface 23, and this provides for enhanced blowing of debris 50 out of the air filter 11. The elliptical shaped patterns 171 created by adjacent nozzle adapter openings 170 overlap one another as indicated by reference number 171a. In addition, in one of the preferred embodiments the nozzle adapter openings 170, 170a can be in defined so as to be in as spaced apart groups 173, 173a each having, for example, four or five nozzle adapter openings 170, 170a, respectively. As shown, the spaced apart groups 173 are offset relative to the spaced apart groups 173a. This allows for the air filter interior surface 23 to be impacted by air exiting the nozzle adapter openings 170, 170a as the V-grooved arbor nozzle adapter 17 rotates.

The arbor end cap 157 defines end cap ports 161 that are in fluid communication with the adapter interior 168. The end cap ports 161 are angled at about a forty-five degree angle relative to the nozzle adapter openings 170 such that the incoming air flow 80 exiting the end cap ports 161 impacts the end portion 13 (see FIG. 6) of the air filter 11 that is being cleaned. Thus, the entire air filter interior surface 23 is cleaned.

Figure 19:
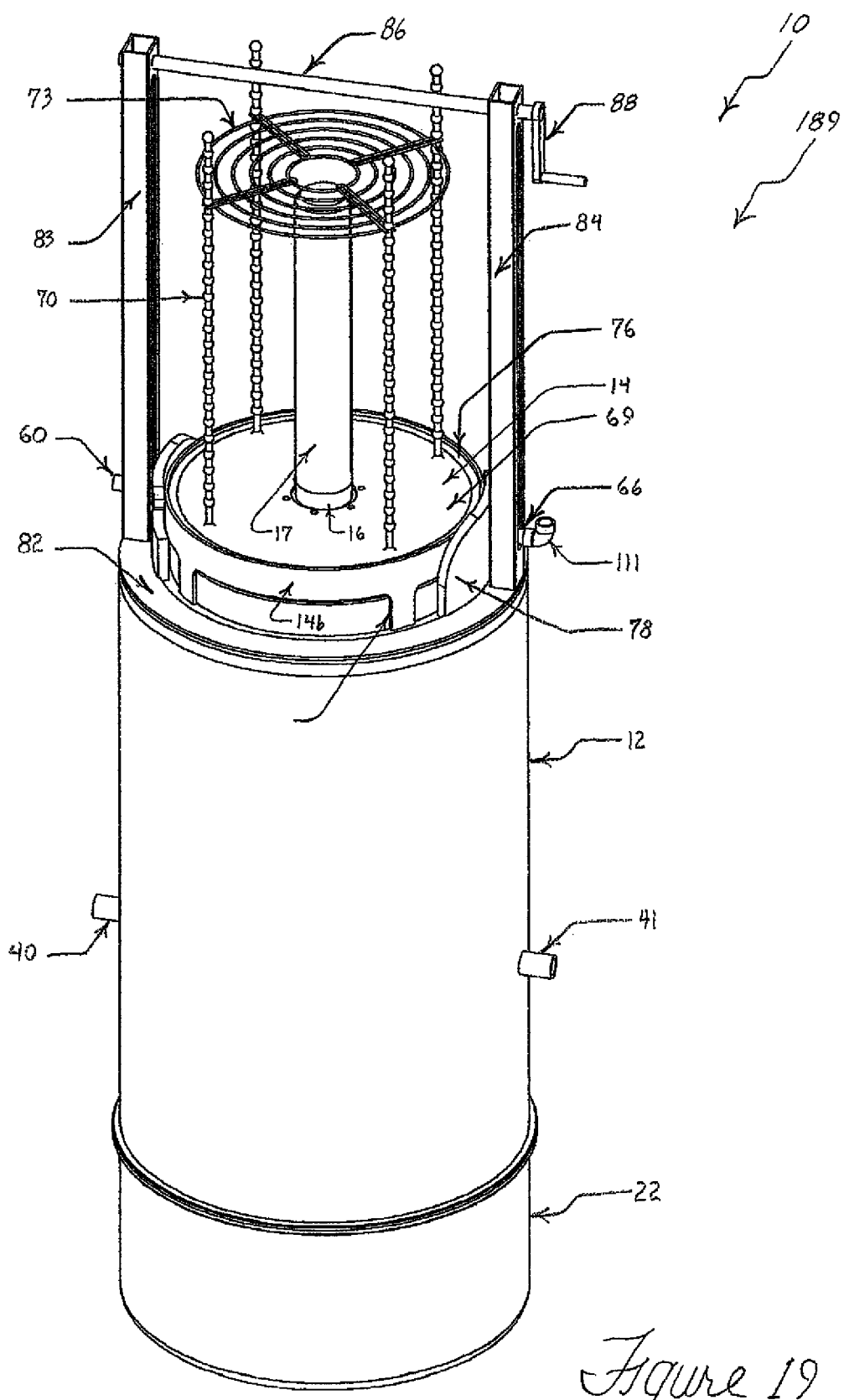
FIG. 19 is a perspective view of the lid supported in an inverted position on a vessel body such that the air filter can be removably secured to beaded cords and a filter support grid plate can be joined to the beaded cord so that the lid and air filter can be turned over at the same time.

In use, the user (not shown) user first rotates the lid 14 such that the lid lifting bar 60 and the incoming air cross tube 66 are moved out of the latches 78 and turns the hand crank 88 causing the strap 89 to coil around the stabilizer bar 86 to which it is connected. As rotation of the hand crank 88 continues the lid 14 and V-grooved arbor nozzle adapter 17 are raised out of the vessel body 12, thus exposing the beaded cords 70 and the filter support grid plate 73. The user then lifts the lid 14 off of the vessel body 12 and flips or inverts the lid 14 and places the lid 14 on the vessel body 12 such that the lid 14 is in a lid inverted position 189 as shown in FIG. 19. The user then installs or removes air filters 11 by adjusting the beaded cords 70 as previously described. If an air filter 11 needs to be cleaned, then the user positions the filter on the lid 14, adjusts the beaded cords 70 accordingly and attaches the filter support grid plate 73 to the beaded cords 70. The lid 14 flipped over and moved into the vessel body 12 and is rotated until the lid cross bar 60 and the incoming air cross tube 66 are rotated into the latches 78. When in place the elbow 111 and air nipple 109 are fitted to the coupler body 107. Next, incoming air 80 from the accumulator 90 initially flows through the air supply assembly 21 at a reduced flow rate and through the incoming air cross tube 66. The air flows through the hub 55 and the arbor axle tube 112 and through the arbor axle tube ports 144 and into the arbor interior 148. The incoming air 80 flows through the slots 124 defined by the vanes 122 of the impeller ring 120, and through the air redirection plate slots 132 defined by the air redirection plate vanes 130 of the air redirection plate 126. This causes the two stage V-grooved live arbor 17 to begin to rotate. The incoming air 80 also flows out of the arbor interior 148 and through the housing port 125 to begin cleaning the air filter 11. Then, the air supply assembly 21 sends a greater volume of air into the arbor axle tube 112 and this opens and exits the pressure relief valve 140 and enters the spinning V-grooved arbor nozzle adapter 17. The incoming air 80 exits the nozzle adapter openings 170, 170a and the housing port 125 and impacts the air filter interior surface 23 blowing dirt and debris 50 out of the air filter 11. It is pointed out that the housing port 125 allows an end portion 27 of the air filer 11 to be cleaned. After the air filter 11 has been cleaned the reverse of the above described process is employed to remove the air filter 11 from the vessel body 12. It is pointed out that due to the offset arrangement of the nozzle adapter openings 170, 170a and the presence of the end cap ports 161 and housing port 125 the entire air filter interior surface 23 is exposed to the blasts of air, thus blowing dirt and debris 50 out of the air filter 11. The dirt and debris 50 falls in the debris bag 51 (FIG. 2). In addition dirty exhaust air flows through the outflow filter 42 and the HEPA filter 42a and out the exhaust tubes 40 and 41. If internal pressure in the vessel body becomes to great, then the programmable logic controller 95 will sense this and power off the apparatus 10.

The air filter 11 may be cleaned in this manner in 2-45 minutes depending on the size thereof. In addition, the air filter reconditioning apparatus 10 is designed to run on a minimum of six cubic feet of air per minute (though it can operate on less with the same results increasing cycle time), which is significantly less than the thirty cubic feet per minute called for in other systems. And, the air filter reconditioning apparatus 10 does not require any vacuum source or external debris 50 collection system, as do other air filter cleaners. The air filter reconditioning apparatus 10 is portable such that it can be readily carried (by one or two people) to different work sites. For example, air filter reconditioning apparatus 10 may have a total weight of about 150 pounds. The power requirements for the air filter reconditioning apparatus 10 are low compared to other air filter cleaning systems. The vessel body 12 may be wrapped in a sound absorbing material so as to make the air filter reconditioning apparatus 10 substantially silent when operating. In addition, the PLC 95 and pressure transducer 94 enables the air filter reconditioning apparatus 10 to clean air filters 11 in accordance with the manufacturer's air pressure parameters.

Figure 14:
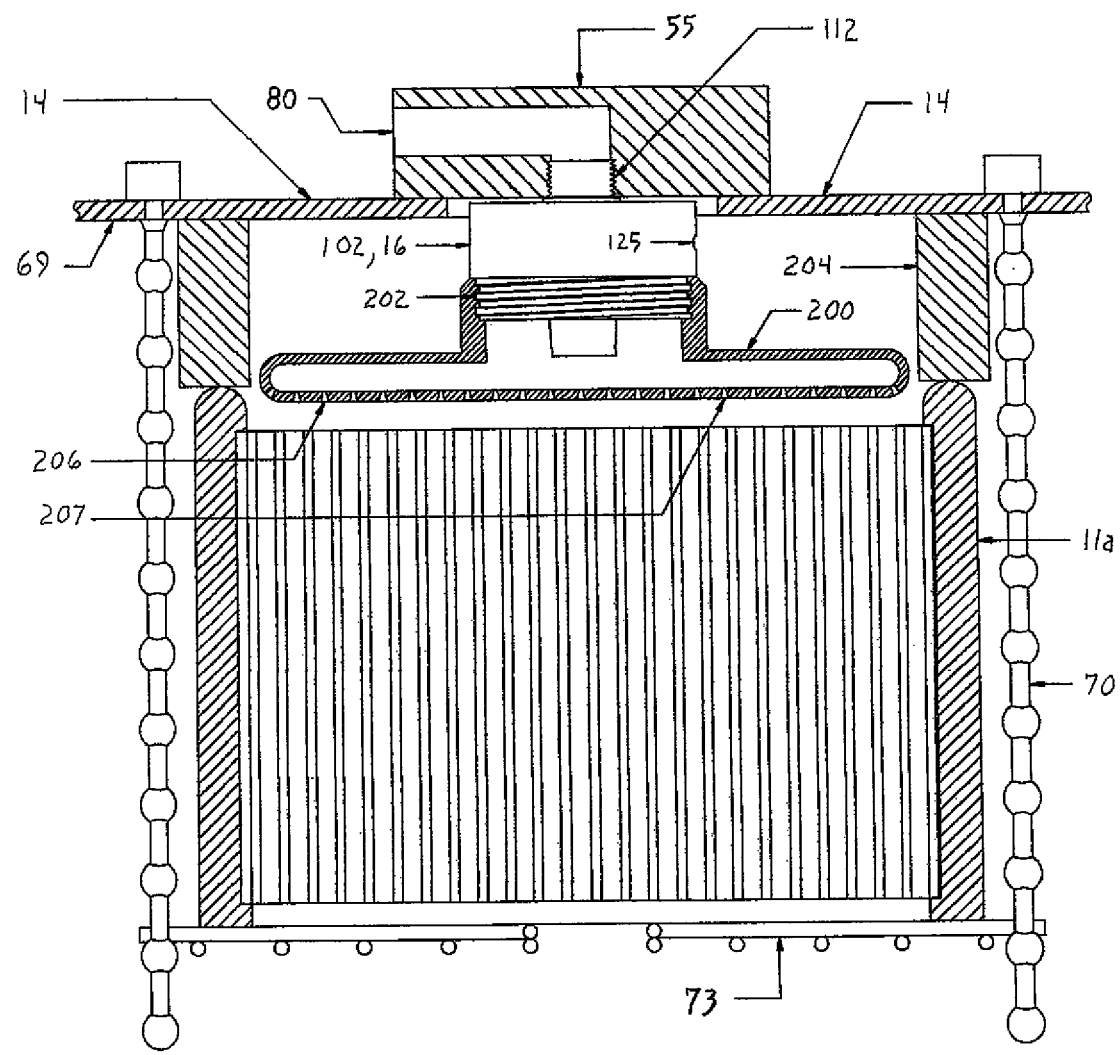
FIG. 14 is a sectional view of another preferred embodiment wherein the V-grooved arbor nozzle adapter is replaced with a selective nozzle adapter.

FIG. 14 is another preferred embodiment wherein the V-grooved arbor nozzle adapter 17 is replaced with a selective nozzle adapter 200 having an internal selective nozzle adapter thread 202 that is threaded to the housing 102 of the two stage live arbor 16. The selective nozzle adapter 200 is shaped like a bar or may be shaped like a crossbar and has defines bar openings 206 that serve as bar nozzles 207 for directing the flow of incoming air 80 out of the selective nozzle adapter 200 and directly into air filter 11a. The bar nozzles 207 can be conical shaped and can be angled outward for complete coverage of the air filter 11a. An adaptor ring 204 is provided and it surrounds the selective nozzle adapter 200. A pressure relief valve 140 is disposed at the end of the arbor axle tube 112. The web plate 69 supports beaded cords 70, and the beaded cords 70 support the filter support grid plate 73. The size of the selective nozzle adapter 200, the adapter ring 204 may be selected to be virtually any suitable size to accommodate a particular air filter 11a. The hold down ring 210 has a hold down ring opening 214, and the hold down ring 210 supports the air filter 11a. The air filter 11a may be embodied as a PowerCore® brand air filter or a panel filter. Such air filters 11a may be embodied to have a plurality tubes such that a cross section of the plurality of tubes is similar in appearance to a honeycomb (as contrasted with a cylindrically shaped air filter shown in FIG. 6). The incoming air flow 80 passes through and exits the bar nozzles 207 while the selective nozzle adapter 200 rotates. Thus, all portions of the air filter 11a are cleaned due to the force of the incoming air dislodging debris 50 and dirt. Thus, the selective nozzle adapter 200 advantageously allows smaller dimensioned air filters 11a to be cleaned, for example the air filters used in small portable equipment and filter bags, and also allows PowerCore® brand air filters to be cleaned.

As shown in FIG. 1, the PLC 95 of the air supply assembly 21 includes a tap-out mode that when activated causes the vibrator 46 or a puffer nozzle to produce vibrations that are transferred to the outflow filter 42. This is useful for the self-cleaning of outflow filters 42, and the position and design (honeycomb) of the outflow filter 42 encourages such self-cleaning. A reduced cubic foot per minute of airflow would also be used.

Figure 15:
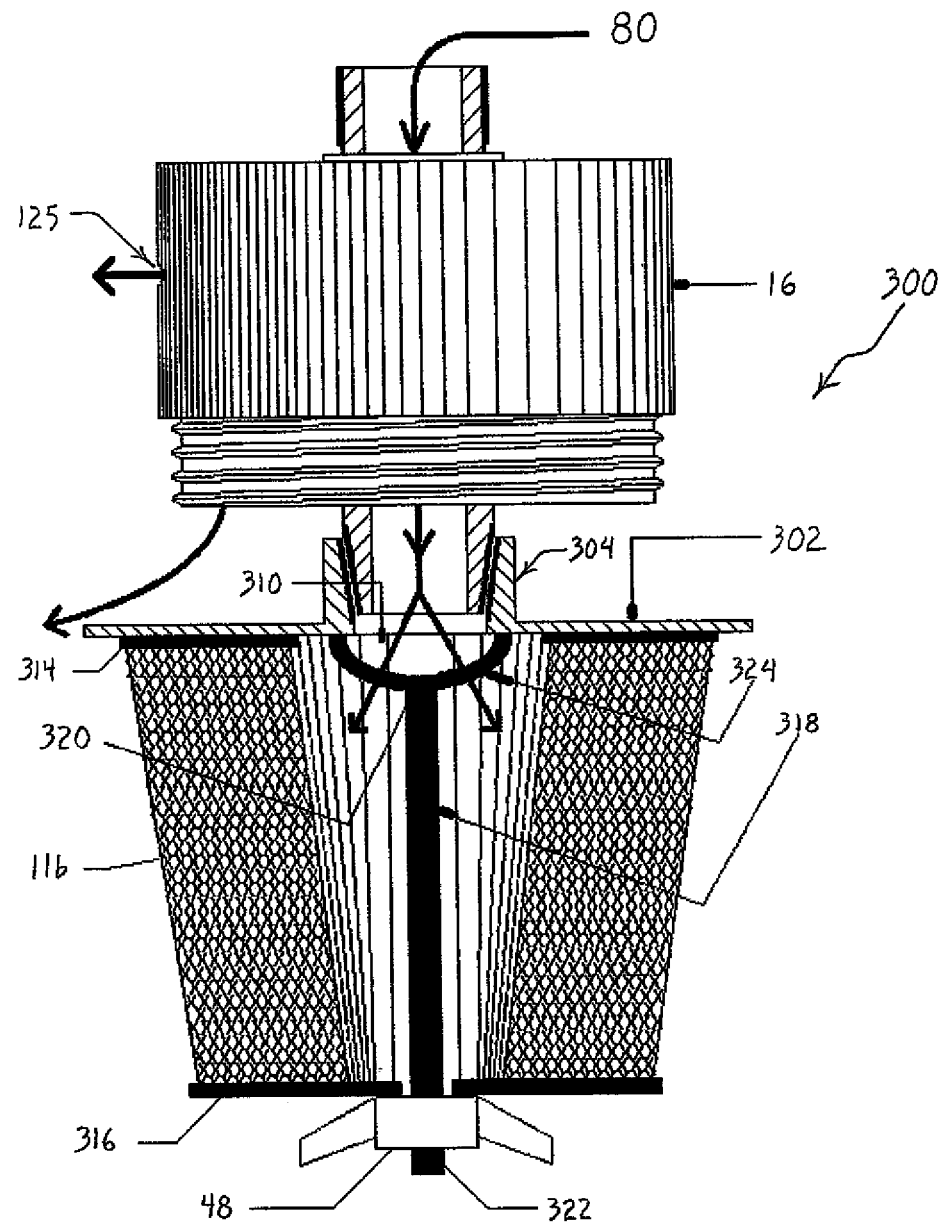
FIG. 15 is a sectional view of another preferred embodiment wherein the V-grooved arbor nozzle adapter is replaced with a filter platform assembly.

FIG. 15 shows another preferred embodiment of the air filter reconditioning apparatus 10 for use in connection with cleaning small engine air filters 11b, for example air filters 11b used in connection with mowers, power tools, powered hand held tools, and the like. There is a two stage nozzle adapter 16 and arbor axle tube 112 as previously described. In addition, there is a filter platform assembly 300 having a platform portion 302 from which extends a connecting hub 304 having an internal connecting hub thread 306. The internal connecting hub thread 306 is threaded to the arbor axle tube 112. The connecting hub 304 has a connecting hub opening 310. The air filter 11b has opposed first and second air filter end plates 314, 316. The first air filter end plate 314 abuts against the platform portion 302 of the filter platform assembly 300. The air filter assembly 300 further includes a stud 318 with first and second stud ends 320, 322, a wing nut 48, and a support member 324 that is joined to the first stud end 320 and the platform portion 302. The stud 318 has a threaded stud portion 330 that extends along the stud 318 and beginning at the second stud end 322. In use, the first end plate 314 of the air filter 11b is positioned against the platform portion 302 and the wing nut 48 is tightened. The air filter 11b is thus held stationary while the incoming air 80 flows through the arbor axle tube 112 and into the air filter 11b.

Figure 16:
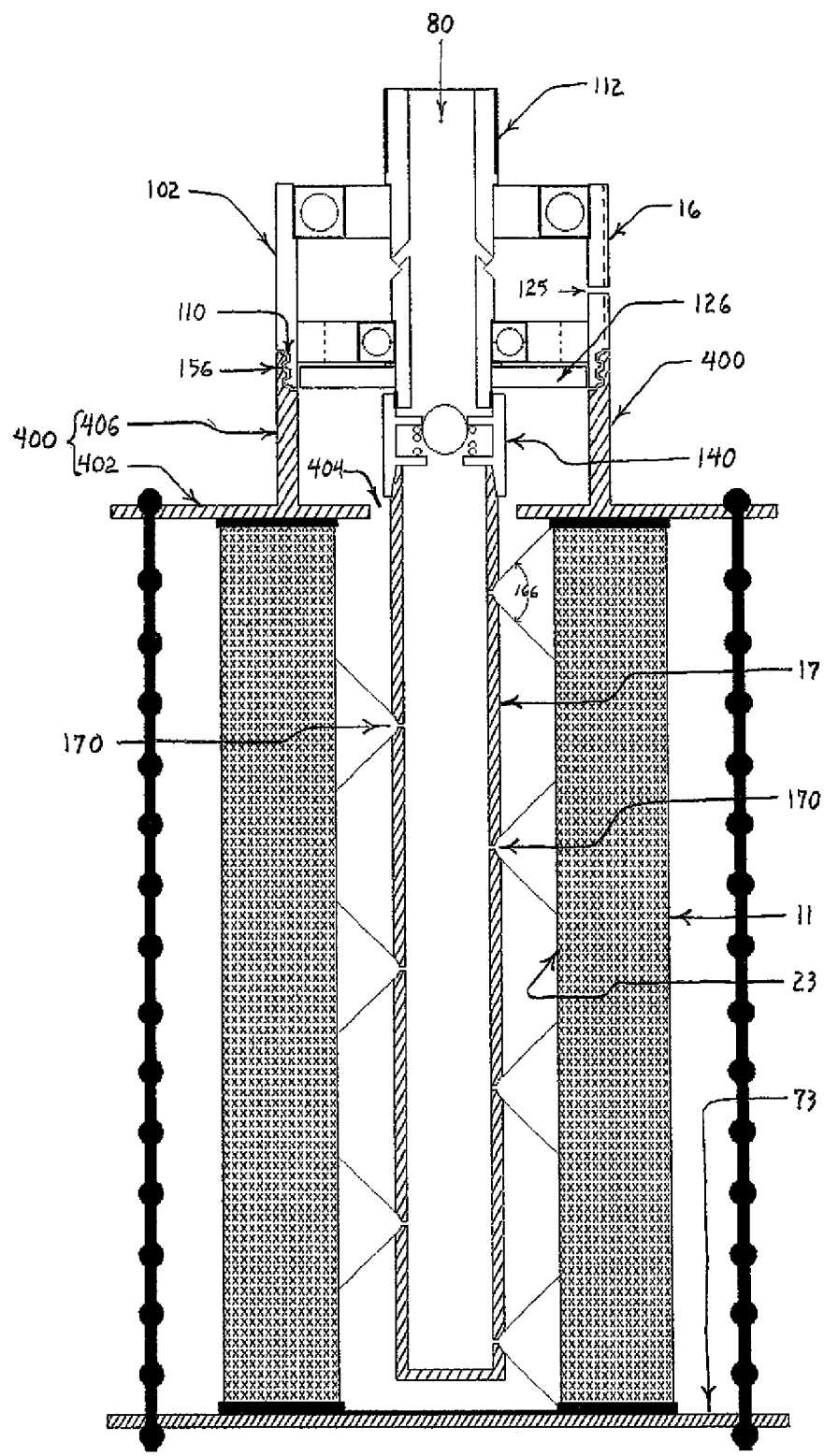
FIG. 16 is sectional view of another preferred embodiment wherein the air filter rotates around a stationary V-grooved arbor nozzle adapter.

FIG. 16 is sectional view of another preferred embodiment of the air filter reconditioning apparatus 10 designed for cleaning and air filters 11 that are cylindrically shaped and have a diameter of about three and a half inches or less. In this embodiment the air filter 11 rotates about the V-grooved arbor nozzle adapter 17, that is, the V-grooved nozzle adapter 17 is stationary relative to the air filter 11. In particular, the V-grooved nozzle adapter 17 is threadably connected to the pressure relief valve 140, and the pressure relief valve 140 is threadably connected to the arbor axle tube 112. There is a filter support attachment 400 that includes an attachment base 402 that defines an attachment base opening 404, and extending from the attachment base 400 is a cylindrical attachment wall 406. The cylindrical attachment wall 406 has an internal adapter thread 156. The internal adapter thread 156 is threaded to the externally threaded portion 110 of the housing 102. The air filter 11 is supported on the filter support grid plate 73, and the filter support grid plate 73 is supported from the attachment base 402 by the beaded cords 70.

In use, the two stage live arbor 16 rotates in response to the flow of incoming air 80 in the manner previously described and rotates the air filter 11. And, the and nozzle adapter openings 170 expel air that impacts the air filter interior surface 23 thus blowing debris 50 out of the rotating filter 11.

FIGS. 17 and 18 show another preferred embodiment for cleaning a filter bag 500 that defines a filter bag opening 501, for example a filter bag 500 used in connection with vacuum devices. The two stage live arbor 16 is the same as previously described, as is the V-grooved arbor nozzle adapter 17. A clamp 502 is provided and the clamp 502 is embodied as a worm drive band clamp in one of the preferred embodiments. The clamp 502 has a band 504 and an adjustment screw 506. Upon turning the adjustment screw 506 the band can be selectively expanded or contracted. Worm drive band clamps are well known to those having ordinary skill in the art.

In use, the filter bag 500 is positioned on the housing 102 such that the housing 102 is disposed in the filter bag opening 501. The user then tightens the adjustment screw 506 until the filter bag 500 is compressed against the housing 102. The filter bag 500 is thus secured in place. The incoming air flow 80 flows out of the two stage live arbor 16 and the nozzle adapter openings 170. As the V-grooved arbor nozzle adapter 17 rotates the air impacts an internal filter bag surface 510 of the filter bag 500. Debris 50 is thus blown out of the filter bag 500. The adjustment screw 506 is loosened and the filter bag 500 is removed after the cleaning process is complete.

It will be appreciated by those skilled in the art that while an air filter reconditioning apparatus and method 10 have been described in detail herein, the invention is not necessarily so limited and other examples, embodiments, uses, modifications, and departures from the embodiments, examples, uses, and modifications may be made without departing from the air filter reconditioning apparatus and method 10 and all such embodiments are intended to be within the scope and spirit of the appended claims.

What is claimed is:

1. An air filter reconditioning apparatus comprising:
an air filter cleaning assembly having;
a vessel body and a lid that is capable of being secured to the vessel body;
an arbor axle tube that defines an arbor axle tube port and the arbor axle tube and arbor axle tube port are for delivering incoming air and wherein the arbor axle tube is supported by the lid;
a two stage live arbor having a first roller bearing fitted on the arbor axle tube, a spacer ring fitted on the first roller bearing, a second roller bearing fitted on the arbor axle tube, an impeller ring fitted on the second roller bearing and the first and second roller bearings are spaced a distance from one another, and a housing that is fitted on the spacer ring and the impeller ring such that the housing is capable of rotating around the arbor axle tube when the arbor axle tube is stationary such that the lid supports the two-stage live arbor;
the two stage live arbor further includes an air redirection plate having an air redirection plate opening and press fit to the arbor axle tube and positioned in the housing such that the impeller ring and second roller bearing are disposed between the air redirection plate and the first roller bearing and the spacer ring;
the housing, the arbor axle tube, the spacer ring, the first roller bearing, the second roller bearing and impeller ring define an arbor interior and the arbor interior is in fluid communication with the arbor axle tube port and wherein the housing defines a housing port that is in fluid communication with the arbor interior;
a V-grooved arbor nozzle adapter threadably connected to the housing such that the V-grooved arbor nozzle adapter is positioned adjacent the air redirection plate such that the arbor nozzle adapter is in fluid communication with incoming air exiting the air redirection plate and the arbor axle tube; and,
an air supply assembly having an accumulator and a compressor and the accumulator is mounted on the vessel body and the air supply assembly for providing source of incoming air flow to rotate the two stage live arbor.

2. The air filter reconditioning apparatus according to claim 1 wherein the impeller ring has vanes that define impeller ring slots for directing the flow of the incoming air flow.

3. The air filter reconditioning apparatus according to claim 2 wherein the air redirection plate has air redirection plate vanes that define air redirection plate slots for directing the flow of the incoming air flow and the redirection plate vanes and the vanes of the impeller ring are sloped in opposite directions.

4. The air filter reconditioning apparatus according to claim 1 further including a hub mounted on the lid and the hub is threaded to the arbor axle tube, a lid cross bar threaded to and extending from the hub, and an incoming air cross tube, and the incoming air cross tube is in fluid communication with the arbor axle tube such that incoming air is delivered to the arbor axle tube, and a latches extending from the vessel body and the lid is capable of being rotated such that the lid cross bar and the incoming air cross tube are movable in and out of the latches, and the lid supports beaded cords for supporting an air filter.

5. The air filter reconditioning apparatus according to claim 1 wherein the V-grooved arbor nozzle adapter has opposed first and second arbor nozzle adapter ends and a cylindrical wall that extends from the first arbor nozzle adapter end to the second arbor nozzle adapter end with an arbor end cap having a beveled edge joined to the second arbor nozzle adapter end and the first arbor adapter end is joined to the housing.

6. The air filter reconditioning apparatus according to claim 5 wherein the cylindrical wall has an external adapter surface having facing first and second adapter walls that slope in opposite directions and meet at a V-groove edge and the first and second adapter walls define a first V-shaped groove such that the first V-shaped groove and the V-groove edge extend longitudinally along the V-grooved arbor nozzle adapter.

7. The air filter reconditioning apparatus according to claim 6 wherein the V-grooved arbor nozzle adapter has an adapter interior surface and the adapter interior surface and the end cap define an adapter interior for receiving the incoming air flow, and the V-grooved nozzle adapter defines nozzle adapter openings that extend through the adapter interior surface and through the V-groove edge such that the nozzle adapter openings are in fluid communication with the first V-shaped groove.

8. The air filter reconditioning apparatus according to claim 7 wherein the arbor end cap defines end cap ports that are in fluid communication with the adapter interior and the end cap ports are angled at about a forty-five degree angle relative to the cylindrical wall of the V-grooved arbor nozzle adapter such that the incoming air flow exiting the end cap ports impacts and an end portion of an air filter.

9. The air filter reconditioning apparatus according to claim 8 wherein the V-grooved arbor nozzle adapter defines a second V-shaped groove that is in fluid communication with nozzle adapter openings defined in the V-grooved arbor nozzle adapter and the second V-shaped groove is diametrically opposed to the first V-shaped groove such that the first and second V-shaped grooves are defined 180 degrees apart from one another on the V-grooved nozzle adapter.

10. The air filter reconditioning apparatus according to claim 9 wherein the nozzle adapter openings that are in fluid communication with the first V-shaped groove are defined in spaced apart groups and the nozzle adapter openings that are in fluid communication with the second V-shaped groove are defined in spaced apart groups wherein the spaced apart groups of nozzle adapter openings defined in the first V-shaped groove are offset relative to the spaced apart groups of nozzle adapter openings defined in the second V-shaped groove such that upon rotation of the V-grooved arbor nozzle adapter an entire air filter interior surface of the air filter is impacted by the air exiting the nozzle adapter openings.

11. The air filter reconditioning apparatus according to claim 10 wherein the air exiting each of the adapter nozzle openings has an elliptical shape pattern and the elliptical shaped pattern of air impacts the air filter interior surface to blow debris out of the air filter.

12. The air filter reconditioning apparatus according to claim 4 wherein the air supply assembly has a programmable logic controller.

13. The air filter reconditioning apparatus according to claim 12 further including a pressure transducer in communication with the accumulator and the programmable logic controller and first and second solenoid valves in fluid communication with the accumulator and under the control of the programmable logic controller and wherein a low flow of the incoming air flow is provided to the a two stage live arbor to initiate rotation thereof when the first solenoid valve opens and a greater flow of the incoming air flow is provided to the arbor axle tube when the second solenoid valve is opened.

14. The air filter reconditioning apparatus according to claim 13 further including a manifold connected to the first and second solenoid valves and connected to an air hose with the air hose connected to a pipe, and a guide is provided and the pipe is supported by the guide and the guide is supported by the vessel body, and a coupler body is provided that is joined to the pipe, and an air nipple is joined to the pipe and joined to an elbow wherein the elbow is joined to the incoming air cross tube and the air nipple is engaged with the coupler body such that incoming air flow will not enter the incoming air cross tube if the incoming air cross tube and the air nipple not engaged.

15. An air filter reconditioning apparatus comprising:
  an air filter cleaning assembly having;
    a vessel body and a lid capable that is capable of being secured to the vessel body;
    an arbor axle tube that defines an arbor axle tube port and the arbor axle tube and arbor axle tube port are for delivering incoming air flow and wherein the arbor axle tube is supported by the lid;
    a two stage live arbor having a first roller bearing fitted on the arbor axle tube, a spacer ring fitted on the first roller bearing, a second roller bearing fitted on the arbor axle tube, an impeller ring fitted on the second roller bearing and the first and second roller bearings are spaced a distance from one another, and a housing that is fitted on the spacer ring and the impeller ring such that the housing is capable of rotating around the arbor axle tube when the arbor axle tube is stationary such that the lid supports the two-stage live arbor;
    the two stage live arbor further includes an redirection plate having an air redirection plate opening and press fit to the arbor axle tube and positioned in the housing such that the impeller ring and second roller bearing are disposed between the air redirection plate and the first roller bearing and the spacer ring;
    the housing, the arbor axle tube, the spacer ring, the first roller bearing, the second roller bearing and impeller ring define an arbor interior and the arbor interior is in fluid communication with the arbor axle tube port;
    a V-grooved arbor nozzle adapter threadably connected to the housing such that the V-grooved arbor nozzle adapter is positioned adjacent the air redirection plate such that the arbor nozzle adapter is in fluid communication with incoming air exiting the air redirection plate and the arbor axle tube; and,
  an air supply assembly having an accumulator for storing compressed air and for providing a source of the incoming air to the arbor axle tube and wherein the accumulator is mounted to a vessel body.

16. The air filter reconditioning apparatus according to claim 15 further including a selective nozzle adapter threadably connected to the housing and having a bar and wherein the bar defines bar openings for directing the flow of incoming air into an air filter.

17. The air filter reconditioning apparatus according to claim 15 further including a filter platform assembly having a platform portion and a connecting hub extending from the platform portion and the connecting hub threadably joined to the arbor axle tube, and the filter platform assembly further having a support member joined to the platform portion and to a stud having a wing nut such that an air filter disposed between the platform portion and the wing nut is capable of being supported.

18. The air filter reconditioning apparatus according to claim 15 further including a the V-grooved nozzle adapter threadably connected to a pressure relief valve joined to the arbor axle tube, and a filter support attachment having an attachment base that defines an attachment base opening and a cylindrical attachment wall extends from the attachment base and the cylindrical attachment wall is threadably connected to the housing such that the housing and filter support attachment are capable of rotating around the V-grooved nozzle adapter.

19. The air filter reconditioning apparatus according to claim 15 further including a clamp having an adjustment band and a screw, and a filter bag that defines a filter bag opening and wherein the housing is partly disposed internal to the filter bag and the filter bag is securely held to the housing with adjustment band and the screw of the clamp.

* * * * *